United States Patent
Agarwal et al.

(10) Patent No.: US 12,368,488 B2
(45) Date of Patent: Jul. 22, 2025

(54) USER EQUIPMENT BEAM SELECTION AND REFINEMENT FOR CARRIER AGGREGATION

(71) Applicant: QUALCOMM Incorporated, San Diego, CA (US)

(72) Inventors: Rishav Agarwal, Howrah (IN); Vishnu Namboodiri Karakkad Kesavan Namboodiri, Hyderabad (IN); Nishika Singla, Ambala (IN)

(73) Assignee: QUALCOMM Incorporated, San Diego, CA (US)

( * ) Notice: Subject to any disclaimer, the term of this patent is extended or adjusted under 35 U.S.C. 154(b) by 476 days.

(21) Appl. No.: 17/880,350

(22) Filed: Aug. 3, 2022

(65) Prior Publication Data
US 2024/0048213 A1 Feb. 8, 2024

(51) Int. Cl.
*H04B 7/06* (2006.01)
*H04L 5/00* (2006.01)
*H04W 24/08* (2009.01)

(52) U.S. Cl.
CPC ........... *H04B 7/0695* (2013.01); *H04L 5/001* (2013.01); *H04W 24/08* (2013.01)

(58) Field of Classification Search
CPC .... H04B 7/0695; H04B 17/26; H04B 17/328; H04B 7/088; H04L 5/001; H04L 5/0023; H04L 5/0048; H04W 24/08
See application file for complete search history.

(56) References Cited

U.S. PATENT DOCUMENTS

| | | | |
|---|---|---|---|
| 2020/0169896 A1* | 5/2020 | Li | H04W 16/28 |
| 2021/0258942 A1 | 8/2021 | Bai et al. | |
| 2022/0085860 A1* | 3/2022 | Bali | H04B 7/0632 |
| 2022/0123824 A1 | 4/2022 | Lee et al. | |
| 2024/0106606 A1* | 3/2024 | He | H04L 5/0053 |

OTHER PUBLICATIONS

International Search Report and Written Opinion—PCT/US2023/067617—ISA/EPO—Sep. 11, 2023.

* cited by examiner

*Primary Examiner* — Sun Jong Kim
(74) *Attorney, Agent, or Firm* — Holland & Hart LLP

(57) ABSTRACT

Methods, systems, and devices for wireless communications are described. A user equipment (UE) may obtain per-beam, per-component carrier measurements for unique combinations of beams and component carriers supported by the UE. The UE may select a first beam that has a highest per-beam, per-component carrier measurement across all component carriers. In addition, the UE may determine a set of candidate beams based on the measurements. The beams included in the set of candidate beams may have per-beam, per-component carrier measurements within some defined value of the measurements corresponding to the first beam. The UE may select an active beam from the set of candidate beams based on an average per-beam, per-component carrier measurement or a difference between maximum and minimum per-beam, per-component carrier measurements of each candidate beam across all component carriers. The UE may communicate with the network entity using the active beam.

27 Claims, 12 Drawing Sheets

USER EQUIPMENT BEAM SELECTION AND REFINEMENT FOR CARRIER AGGREGATION

FIELD OF TECHNOLOGY

The following relates to wireless communications, including user equipment (UE) beam selection and refinement for carrier aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some UEs may support multiple component carriers and multiple spatial beams for transmitting and receiving communications. In some cases, however, methods for selecting a beam on a particular component carrier may reduce signaling throughput and performance of messages communicated using the selected beam.

SUMMARY

The described techniques relate to improved methods, systems, devices, and apparatuses that support user equipment (UE) beam selection and refinement for carrier aggregation. For example, the UE may perform individual measurements for each beam supported by the UE and on each primary component carrier (PCC) or each secondary component carrier (SCC) available during a carrier aggregation operation. That is, the UE may perform a set of multiple per-beam, per-component carrier measurements. The UE may determine a first beam for carrier aggregation based on the set of multiple per-beam, per-component carrier measurements, where the first beam may correspond to a highest individual per-beam, per-component carrier measurement. In some examples, the UE may determine a set of candidate beams for consideration in addition to the first beam, which may be based on one or more thresholds. In some examples, the UE may determine a per-beam metric derived from the individual per-beam, per-component carrier measurements. In some cases, the per-beam metric may be based on each of the per-component carrier measurements for that beam. For example, the per-beam metric may be an average of the per-component carrier reference signal received power (RSRP), signal-to-noise ratio (SNR) measurements, or reference signal received quality (RSRQ) measurements for a beam, or may be a spread between a maximum and minimum RSRP or SNR measurement for the beam. The UE may compare the per-beam metric for each candidate beam in the set of candidate beams and the first beam, and based on the comparison, the UE may determine an active beam to use during carrier aggregation (e.g., where the active beam may be the first beam or any one of the candidate beams).

A method for wireless communication at a UE is described. The method may include obtaining a set of multiple per-beam per-component carrier measurements corresponding to unique combinations of individual ones of a set of multiple UE beams and individual ones of a set of multiple component carriers for the wireless communication between the UE and a network entity, determining a set of candidate beams as a subset of the set of multiple UE beams having at least one per-beam per-component carrier measurement that satisfies one or more thresholds, selecting, for the wireless communication, an active beam from the set of candidate beams based on a per-beam metric that is derived from multiple per-beam per-component carrier measurements corresponding to the active beam, and communicating with the network entity using the active beam.

An apparatus for wireless communication at a UE is described. The apparatus may include a processor, memory coupled with the processor, and instructions stored in the memory. The instructions may be executable by the processor to cause the apparatus to obtain a set of multiple per-beam per-component carrier measurements corresponding to unique combinations of individual ones of a set of multiple UE beams and individual ones of a set of multiple component carriers for the wireless communication between the UE and a network entity, determine a set of candidate beams as a subset of the set of multiple UE beams having at least one per-beam per-component carrier measurement that satisfies one or more thresholds, select, for the wireless communication, an active beam from the set of candidate beams based on a per-beam metric that is derived from multiple per-beam per-component carrier measurements corresponding to the active beam, and communicate with the network entity using the active beam.

Another apparatus for wireless communication at a UE is described. The apparatus may include means for obtaining a set of multiple per-beam per-component carrier measurements corresponding to unique combinations of individual ones of a set of multiple UE beams and individual ones of a set of multiple component carriers for the wireless communication between the UE and a network entity, means for determining a set of candidate beams as a subset of the set of multiple UE beams having at least one per-beam per-component carrier measurement that satisfies one or more thresholds, means for selecting, for the wireless communication, an active beam from the set of candidate beams based on a per-beam metric that is derived from multiple per-beam per-component carrier measurements corresponding to the active beam, and means for communicating with the network entity using the active beam.

A non-transitory computer-readable medium storing code for wireless communication at a UE is described. The code may include instructions executable by a processor to obtain a set of multiple per-beam per-component carrier measurements corresponding to unique combinations of individual ones of a set of multiple UE beams and individual ones of a set of multiple component carriers for the wireless communication between the UE and a network entity, determine a set of candidate beams as a subset of the set of multiple UE beams having at least one per-beam per-component carrier measurement that satisfies one or more thresholds, select, for the wireless communication, an active beam from the set of candidate beams based on a per-beam metric that is derived from multiple per-beam per-component carrier measurements corresponding to the active beam, and communicate with the network entity using the active beam.

In some examples of the method, apparatuses, and non-transitory computer-readable medium described herein, determining the set of candidate beams may include operations, features, means, or instructions for selecting a first UE beam from the set of multiple UE beams, the first UE beam selected based on a first value of one of the per-beam per-component carrier measurements that correspond to the first UE beam and determining the set of candidate beams as the subset of the set of multiple UE beams that may have at least one respective second value of the per-beam per-component carrier measurements that may be within a range of the one or more thresholds with respect to the first value.

In some examples of the method, apparatuses, and non-transitory computer-readable medium described herein, the first value and the respective second values may be lowest decibel measurements of the per-beam per-component carrier measurements for the first UE beam and for the one or more of the set of multiple UE beams other than the first UE beam, respectively.

In some examples of the method, apparatuses, and non-transitory computer-readable medium described herein, each candidate beam of the set of candidate beams corresponds to a same phasor as the first UE beam.

Some examples of the method, apparatuses, and non-transitory computer-readable medium described herein may further include operations, features, means, or instructions for determining the per-beam metric for each of one or more beams of the set of candidate beams based on an average measurement of the per-beam per-component carrier measurements corresponding to each of the one or more beams of the set of candidate beams, where the active beam may be selected from the set of candidate beams based on the average measurement of each of the one or more beams of the set of candidate beams.

Some examples of the method, apparatuses, and non-transitory computer-readable medium described herein may further include operations, features, means, or instructions for refining the active beam according to a periodicity, where the refining includes re-calculating the average measurement of each of the one or more beams of the set of candidate beams.

In some examples of the method, apparatuses, and non-transitory computer-readable medium described herein, refining the active beam may include operations, features, means, or instructions for refining the active beam and the first UE beam during alternating synchronization signal block (SSB) occasions.

In some examples of the method, apparatuses, and non-transitory computer-readable medium described herein, selecting the active beam from the set of candidate beams may include operations, features, means, or instructions for selecting, as the active beam, one of the one or more of the set of multiple UE beams other than the first UE beam.

Some examples of the method, apparatuses, and non-transitory computer-readable medium described herein may further include operations, features, means, or instructions for determining respective spread values for each of one or more beams of the set of candidate beams, where each of the respective spread values represents a per-beam difference between a maximum value of the per-beam per-component carrier measurements for a respective beam and a minimum value of the per-beam per-component carrier measurements for the respective beam, where the respective spread values may be the per-beam metrics for the one or more beams of the set of candidate beams.

In some examples of the method, apparatuses, and non-transitory computer-readable medium described herein, the per-beam metric of the active beam includes a smallest respective spread value of each of one or more beams of the set of candidate beams.

Some examples of the method, apparatuses, and non-transitory computer-readable medium described herein may further include operations, features, means, or instructions for refining the active beam according to a periodicity, where the refining includes re-calculating the respective spread values for each of one or more beams of the set of candidate beams.

In some examples of the method, apparatuses, and non-transitory computer-readable medium described herein, refining the active beam may include operations, features, means, or instructions for refining the active beam and the first UE beam during alternating SSB occasions.

In some examples of the method, apparatuses, and non-transitory computer-readable medium described herein, selecting the active beam may include operations, features, means, or instructions for applying a per-candidate beam weight to the per-beam metric for each of the one or more beams of the set of candidate beams.

In some examples of the method, apparatuses, and non-transitory computer-readable medium described herein, the per-candidate beam weight may be based on respective bandwidths of one or more component carriers corresponding to the set of candidate beams.

In some examples of the method, apparatuses, and non-transitory computer-readable medium described herein, the set of multiple per-beam per-component carrier measurements includes a set of multiple RSRP measurements, a set of multiple SNR measurements, a set of multiple RSRQ measurements, or any combination thereof.

DETAILED DESCRIPTION

Figure 1:
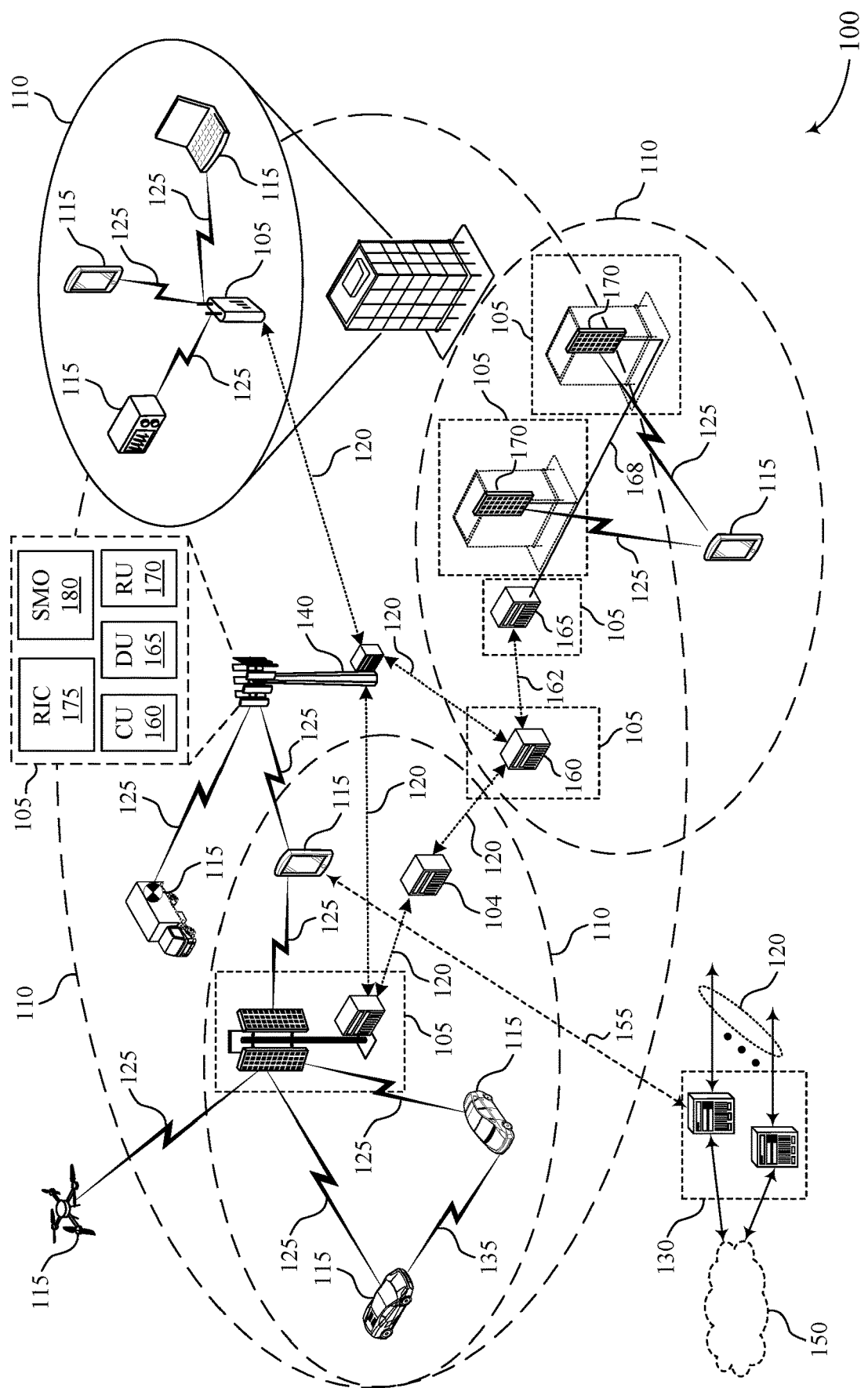
FIG. 1 illustrates an example of a wireless communications system that supports user equipment (UE) beam selection and refinement for carrier aggregation in accordance with one or more aspects of the present disclosure.

In a New Radio (NR) millimeter wave (mmW) system, a user equipment (UE) may support multiple frequency range 2 (FR2) carriers while using dual connectivity (DC) or carrier aggregation (CA) operation. For example, a UE may communicate with a network entity using CA, where the UE may communicate via a primary component carrier (PCC) and one or more secondary component carriers (SCCs). In addition, the UE may support multiple spatial beams in given directions, where the UE may select one of the multiple spatial beams as a serving beam. In some examples, the UE may select the serving beam (e.g., a beam for transmitting the uplink messages to a network entity) based on measured metrics such as a reference signal received power (RSRP), a signal-to-noise ratio (SNR), a reference signal received quality (RSRQ), a spectral efficiency, and the like.

Thus, in CA, where the UE may communicate via both a PCC and one or more SCCs, the UE may select a beam based on measurements of signals received from both the PCC and the one or more SCCs. In addition, the beam selection for carrier aggregation communications may be designed to prioritize the PCC. However, in some cases, prioritizing the PCC connection (e.g., over the UE's connection with the one or more SCCs) may reduce overall performance of communications between the UE and a network entity. In some instances, for example, a beam may have a relatively increased overall performance across all active carrier aggregation carriers than a beam that is highly performant on the PCC.

The techniques described herein support improvements to UE beam selection during CA. In some examples, the UE may perform individual measurements (e.g., RSRP, SNR, or RSRQ measurements) for each beam supported by the UE and on each PCC or SCC available during a carrier aggregation operation. That is, the UE may perform a set of multiple per-beam, per-component carrier measurements. The UE may determine a first beam for carrier aggregation based on the set of multiple per-beam, per-component carrier measurements, where the first beam may correspond to a highest individual per-beam, per-component carrier measurement. In some examples, the UE may determine a set of candidate beams for consideration in addition to the first beam. For example, the UE may define a first threshold that corresponds to RSRP measurements and a second threshold that corresponds to SNR measurements, and the UE may select the set of candidate beams to include any beam-and-component carrier combinations whose per-beam, per-component carrier measurements satisfy the first threshold or second threshold of the first beam measurement.

In some examples, the UE may determine a per-beam metric derived from the individual per-beam, per-component carrier measurements. In some cases, the per-beam metric may be based on each of the per-component carrier measurements for that beam. For example, the per-beam metric may be an average of the per-component carrier RSRP, SNR, or RSRQ measurements for a beam, or may be a spread between a maximum and minimum RSRP, SNR, or RSRQ measurement for the beam. The UE may compare the per-beam metric for each candidate beam in the set of candidate beams and the first beam, and based on the comparison, the UE may determine an active beam to use during carrier aggregation (e.g., where the active beam may be the first beam or any one of the candidate beams).

Aspects of the subject matter described herein may be implemented to realize one or more of the following potential improvements, among others. The techniques employed by the described network devices (e.g., UEs) may enable a UE to select a most performant beam on a PCC or on an SCC for communicating with a network entity, which may improve overall communications with a network entity. Additionally, selecting an active beam from a set of candidate beams and a UE beam based on a per-beam metric may improve UE beam selection, resulting in increased signaling throughput and efficiency, among other benefits.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to UE beam selection and refinement for CA.

FIG. 1 illustrates an example of a wireless communications system 100 that supports UE beam selection and refinement for carrier aggregation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support UE beam selection and refinement for carrier aggregation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest SNR or otherwise acceptable signal quality based on listening according to multiple beam directions).

A UE 115 may perform beam selection based on measured metrics of a serving synchronization signal block (SSB), such as an RSRP, a SINR, an RSRQ, a spectral efficiency, and the like. In an Evolved Universal Terrestrial Radio Access Network (E-UTRAN) New Radio Dual Connectivity (ENDC) system or a New Radio Dual Connectivity (NRDC) system, where a secondary cell group (SCG) may operate in frequency range 2 (FR2) (e.g., a primary secondary cell (PSCell) operates in FR2), the UE 115 may select a beam on a PCC as a serving beam for the UE 115. All SCCs may use the serving beam for uplink and downlink activities. In addition, the UE 115 may use beam refinement techniques for the serving beam. However, this PCC-biased approach to beam selection may reduce beam performance as the UE 115 may refrain from measuring the serving receiving beam of the PCC as the active beam on some or all SCCs, thus reducing the throughput and overall performance on those SCCs. For example, SSCs that serve SSBs, and PCCs serving the SSBs may be similarly spatially-oriented. However, there may still be a significant difference (e.g., up to 10 decibels (dB)) between the RSRPs of the PCC and the SCC, which may be reduced by using an equal weight for all component carriers during a UE beam selection process.

In some examples, overall performance of the UE 115 may be determined based on a downlink throughput, which may be directly proportional to a measured RSRP on all component carriers (e.g., PCCs and SCCs). Selecting a serving beam based on the PCC (e.g., without consideration for SCCs) may reduce throughput and performance of communications between a UE 115 and a network entity 105. That is, the UE 115 may select a serving beam that is most performant on the PCC, but may lack performance on all other SCCs. For example, selecting a most-performance beam for the PCC as the most-performant beam overall may reduce performance as some other beam may have improved RSRP measurements on SCCs, while also maintaining a high measurement on the PCC. Accordingly, in a carrier aggregation scenario, a beam selected blindly based on the most-performant component carrier (e.g., the PCC) may be sub-optimal.

Additionally, or alternatively, selecting a serving beam based on the PCC (e.g., without consideration for SCCs) may result in sub-optimal refinement of the serving beam. The UE 115 may perform a refinement procedure around a most performant beam for the PCC, but not for a most performant beam across the PCC and one or more SCCs (e.g., based on joint beam selection). As such, the serving beam that has the highest RSRP measurements across all component carriers may be unrefined, which may reduce the quality of communications between the UE 115 and a network entity 105, specifically reducing the readiness of the UE 115 in CA.

In a frequency range 1 (FR1) and FR2 carrier aggregation scenario, where a primary cell (PCell) operates in FR1 and where FR2 SCCs are activated, the performance of the UE 115 may be affected only if the most performant beam-SCC pairing is considered for beam selection and refinement. Some SCCs may have lower RSRPs with the most performant beam selected, which may degrade performance. However, the SCC that the UE 115 prioritizes or uses for beam selection may be unspecified in this FR1+FR2 carrier aggregation scenario.

In some cases, a UE 115 operating in an NR, mmW system may use beam refinement to refine active beams corresponding to the UE 115, and to strengthen a beam-pair link. In some examples, refined beams may be more directional than their parent beams and thus, may provide improved performance. Each potential beam may have multiple candidate beams which the UE 115 may measure on SSB occasions to find performant child beams. In some cases, the UE 115 may just refine a serving beam of a PCC operating in FR2, where all SCCs may use that serving beam.

The wireless communication system 100 may support UE beam selection and refinement during carrier aggregation based on multiple per-beam, per-component carrier measurements. In some examples, a UE 115 may perform individual measurements (e.g., RSRP or SNR measurements) for each beam supported by the UE 115 and on each PCC or SCC available during a carrier aggregation operation. That is, the UE 115 may perform a set of multiple per-beam, per-component carrier measurements. The UE 115 may determine a first beam for carrier aggregation based on the set of multiple per-beam, per-component carrier measurements, where the first beam may correspond to a highest individual per-beam, per-component carrier measurement. In some examples, the UE 115 may determine a set of candidate beams for consideration in addition to the first beam. For example, the UE 115 may define a first threshold that corresponds to RSRP measurements and a second threshold that corresponds to SNR measurements, and the UE 115 may select the set of candidate beams to include any beam-and-component carrier combinations whose per-beam, per-component carrier measurements satisfy the first threshold or second threshold of the first beam measurement.

In some examples, the UE 115 may determine a per-beam metric derived from the individual per-beam, per-component carrier measurements. In some cases, the per-beam metric may be based on each of the per-component carrier measurements for that beam. For example, the per-beam metric may be an average of the per-component carrier RSRP or SNR measurements for a beam, or may be a spread between a maximum and minimum RSRP or SNR measurement for the beam. The UE 115 may compare the per-beam metric for each candidate beam in the set of candidate beams and the first beam, and based on the comparison, the UE 115 may determine an active beam to use during carrier aggregation (e.g., where the active beam may be the first beam or any one of the candidate beams).

Figure 2:
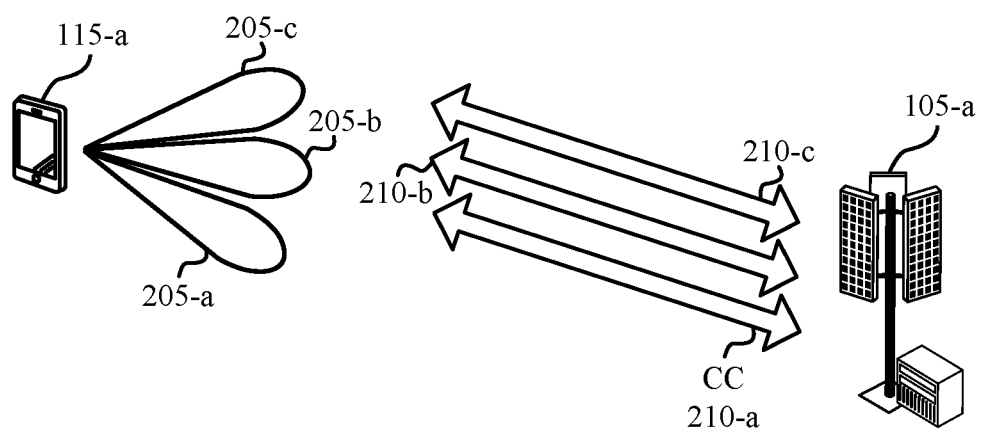
FIG. 2 illustrates an example of a wireless communications system that supports UE beam selection and refinement for carrier aggregation in accordance with one or more aspects of the present disclosure.

FIG. 2 illustrates an example of a wireless communications system 200 that supports UE beam selection and refinement for carrier aggregation in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a and a network entity 105-a, which may be examples of corresponding devices described herein. In some examples, the UE 115-a may select a beam 205 for communicating with the network entity 105-a when using carrier aggregation operation, which may increase signaling throughput and performance, among other benefits.

The wireless communications system 200 may support communications between the UE 115-a and the network entity 105-a, which may operate in FR2. In some examples, the UE 115-a may support a beam 205-a, a beam 205-b, a beam 205-c, and any other quantity of UE beams, which the UE 115-a may use to transmit uplink messages to the network entity 105-a. In addition, the UE 115-a may communicate with the network entity 105-a using a set of component carriers 210. For example, the wireless communications system 200 may support a component carrier 210-a, a component carrier 210-b, and a component carrier 210-c, which may correspond to a first SCC, a second SCC, and a third SCC, respectively. Alternatively, a component carrier 210 may correspond to a PCC. For example, the component carrier 210-a and the component carrier 210-b may correspond to SCCs, and the component carrier 210-c may correspond to a PCC. As such, the UE 115-a communicate using the beams 205 and a PCC, one or more SCCs, or a combination thereof.

In some cases, the UE 115-a may perform beam selection and refinement for carrier aggregation such that the UE 115-a may select an active (e.g., serving) beam from the beams 205 based on overall performance across all component carriers 210 rather than select the most performant beam on just a PCC. Each beam 205 may perform differently on different component carriers 210. For example, the UE 115-a may measure an RSRP, an SNR, an RSRQ, a spectral efficiency, or some other metric for each beam 205 on each component carrier 210, where beams 205 may correspond to higher measurements on some component carriers 210 than others. In some examples, the UE 115-a may obtain a set of multiple per-beam, per-component carrier measurements corresponding to unique combinations of individual ones of the set of beams 205 (e.g., UE beams) and individual ones of the set of component carriers 210.

The UE 115-a may identify a beam 205 (e.g., the beam 205-a) with the highest RSRP and SNR per-beam, per-component carrier measurements across all component carriers 210 (e.g., in the case of FR1 and FR2 CA) or for the PCC (e.g., the component carrier 210-c, where a PCell operates in FR2). In some examples, the RSRP measurement for the beam 205-a, which may be a first UE beam, may be equal to X1 dB, and the SNR measurement for the beam 205-a may be equal to Y1 dB. The UE 115-a may determine a set of candidate beams of the beams 205, where the UE 115-a may select an active beam from the set of candidate beams in addition to the beam 205-a. In some cases, the UE 115-a may determine the set of candidate beams as a subset of the beams 205 having at least one per-beam, per-component carrier measurements that satisfies one or more thresholds. The set of candidate beams may limit how many beams the UE 115-a may select the active beam from, which may improve efficiency and accuracy of the beam selection procedure.

To determine the set of candidate beams, the UE 115-a may define a first threshold corresponding to RSRP and a second threshold corresponding to SNR. For example, the first threshold may correspond to an RSRP measurement value of (X1+k1) dB, and the second threshold may correspond to an SNR measurement value of (Y1+k2) dB. In some examples, k1 dB and k2 dB may correspond to an RSRP offset and an SNR offset, respectively. The UE 115-*a* may use the first and second thresholds to filter out beams 205 with low per-beam, per-component carrier measurements from the set of candidate beams such that the UE 115-*a* refrains from considering those beams 205 as a possible active beam. In some examples, the UE 115-*a* may compare the highest RSRP and SNR measurements of each beam 205 on any given component carrier 210 (e.g., any SCC) to the first and second thresholds, respectively. The beams 205 whose measurements satisfy the first and second thresholds (e.g., are within k1 dB of X1 dB or within k2 dB of Y1 dB) may be included in the set of candidate beams.

In some cases, when determining the set of candidate beams, the UE 115 *a* may select the beam 205 *a* (e.g., the first UE beam) from the set of beams 205 based on a first value of one or the per-beam, per-component carrier measurements that correspond to the beam 205-*a*. The UE 115 *a* may determine the set of candidate beams based on selecting the beam 205-*a*. For example, the UE 115 *a* may determine the set of candidate beams as the subset of the beams 205 that have at least one respective second value of the per-beam, per-component carrier measurements that are within a range of the one or more thresholds with respect to the first value. For example, if the beam 205 *a* corresponds to an RSRP measurement of −90 dB (e.g., the highest RSRP measurement of the beams 205 across all component carriers 210, X1), the beams 205 in the set of candidate beams may have at least one per-beam, per-component carrier measurement value that is within a range of 5 dB (e.g., a value of k1 of the first threshold) of the RSRP measurement for the beam 205 *a* (e.g., −95 dB). That is, the first value and the respective second values may be lowest dB measurements of the per-beam, per-component carrier measurements for the first UE beam and for one or more other beams 205. In addition, the beams 205 included in the set of candidate beams may correspond to a same phasor as the beam 205-*a*. As such, the UE 115 *a* may consider beams 205 which are included in the set of candidate beams and on an active phasor to be the active beam.

Upon determining the set of candidate beams, the UE 115-*a* may use a joint optimization mechanism to select an active beam from the set of candidate beams. That is, the UE 115-*a* may select the active beam from the set of candidate beams based on a per-beam metric, which the UE 115-*a* may derive from multiple per-beam, per-component carrier measurements corresponding to the active beam. In some cases, the UE 115-*a* may prioritize any component carrier 210 by including a prioritization factor (e.g., alpha) in the per-beam metric.

The per-beam metric may include an average measurement of the per-beam, per-component carrier measurements corresponding to each beam 205 included in the set of candidate beams, and the UE 115-*a* may select the active beam from the set of candidate beams based on the average measurements. That is, the UE 115-*a* may select the active beam as the beam 205 included in the set of candidate beams which maximizes joint RSRP and SNR metrics across all component carriers. As configured at the UE 115-*a*, a joint RSRP metric (e.g., measured on a per-beam basis) may be equal to $1/N \sum_{i=0}^{N-1} (1-\text{alpha}_i)*\text{RSRP}_i$, and a joint SNR metric (e.g., measured on a per-beam basis) may be equal to $1/N \sum_{i=0}^{N-1} (1-\text{alpha}_i)*\text{SNR}_i$. N may represent a total quantity of component carriers 210 supported by the UE 115-*a* and the network entity 105-*a*, $\text{alpha}_i$ may represent the prioritization factor, $\text{RSRP}_i$ may represent a given per-beam, per-component carrier RSRP measurement, and $\text{SNR}_i$ may represent a given per-beam, per-component carrier SNR measurement. If $\text{alpha}_i$=0, each component carrier 210 may be weighed equally (e.g., no component carrier 210 may be prioritized), and the joint RSRP and SNR metrics may be reduced to average RSRP and average SNR measurements. Accordingly, the UE 115-*a* may average RSRP and SNR measurements for each beam 205 included in the set of candidate beams (e.g., the beam 205-*b* and the beam 205-*c*) and the beam 205-*a* (e.g., the first UE beam) across all component carriers 210.

Alternatively, the UE 115-*a* may assign a higher priority to a particular component carrier 210. For example, in prioritizing component carriers 210 based on bandwidth, the UE 115-*a* may assign a component carrier 210 with a highest bandwidth a higher weight than other component carriers 210 in the joint RSRP and SNR metrics. That is, the UE 115-*a* may apply a per-candidate beam weight to the per-beam metric for each beam 205 included in the set of candidate beams. If $\text{alpha}_i$ is inversely proportional to $BM_i$, which may represent a bandwidth of each component carrier 210, the term ($1-\text{alpha}_i$) in the joint RSRP and SNR metrics may assign a highest weight to the component carrier 210 with the highest bandwidth.

As described herein, the UE 115-*a* may obtain the per-beam, per-component carrier RSRP measurements for each beam 205. For example, on the component carrier 210-*a*, the UE 115-*a* may measure RSRP values of −90 dB for the beam 205-*a* (e.g., the first UE beam), −86 dB for the beam 205-*b*, and −83 dB for the beam 205-*c*. On the component carrier 210-*b*, the UE 115-*a* may measure RSRP values of −80 dB for the beam 205-*a* (e.g., the highest RSRP measurement of any beam-component carrier combination), −84 dB for the beam 205-*b*, and −85 dB for the beam 205-*c*. In addition, on the component carrier 210-*c*, the UE 115-*a* may measure RSRP values of −90 dB for the beam 205-*a*, −85 dB for the beam 205-*b*, and −86 dB for the beam 205-*c*. Using the first threshold, the UE 115-*a* may determine that the beam 205-*b* and the beam 205-*c* may be included in the set of candidate beams. For example, given a value k1 of 5 dB and a maximum RSRP value X1 of −80 dB (e.g., corresponding to the highest RSRP measurement for the beam 205-*a* on the component carrier 210-*b*), the UE 115-*a* may include the beam 205-*b* and the beam 205-*c* in the set of candidate beams (e.g., as −84 dB and −85 dB RSRP measurement values for the beam 205-*b* and the beam 205-*c*, respectively, are within the −80 dB+/−5 dB value defined in the first threshold).

Based on the per-beam metric described herein (e.g., an unweighted, average RSRP metric across all component carriers 210), the UE 115-*a* may calculate an average RSRP for each beam 205 across all component carriers 210. For example, using the per-beam, per-component carrier RSRP measurements, the UE 115-*a* may calculate average RSRPs of −86.7 dB for the beam 205-*a*, −85 dB for the beam 205-*b*, and −84.7 dB for the beam 205-*c*. As such, despite the beam 205-*a* (e.g., the first UE beam) having the highest RSRP measurement of the beams 205 across all the component carriers 210 (e.g., −80 dB on the component carrier 210-*b*), the beam 205-*b* and the beam 205-*c* may have higher average RSRP measurements across all the component carriers 210 than the beam 205-*a*, where the beam 205-*c* may have the highest average RSRP measurement and individually have the highest RSRP measurement on a different component carrier 210 than the beam 205-*c* (e.g., −83 dB on the component carrier 210-*a*). Put another way, although the beam 205-*b* and the beam 205-*c* may measure slightly lower than the beam 205-*a* on the component carrier 210-*b*, the beam 205-*b* and the beam 205-*c* may have overall higher measurement metrics averaged across all of the component carriers 210. Additionally, while the beam 205-*c* may measure slightly lower than the beam 205-*a* on the component carrier 210-*b*, the beam 205-*c* may individually have the highest RSRP measurement on the component carrier 210-*a* in addition to having the overall higher measurement metrics averaged across all of the component carriers 210. Accordingly, the UE 115-*a* may select the beam 205-*c* as the active beam on the component carrier 210-*a* for communicating with the network entity.

In some examples, if the UE 115-*a* identifies that a beam 205 in the set of candidate beams (e.g., the beam 205-*b*) has a higher average RSRP or SNR than the selected active beam (e.g., the beam 205-*c*), the UE may switch the active beam (e.g., from the beam 205-*c* to the beam 205-*b*). That is, the UE 115-*a* may select, as the active beam, one of the beams 205 other than the beam 205-*a* (e.g., the first UE beam). Additionally, or alternatively, the UE 115-*a* may refine the selected active beam to maintain efficient communications with the network entity 105-*a*. In some cases, the UE 115-*a* may refine the active beam according to a periodicity, the refining including re-calculating the average measurement of each of the one or more beams 205 of the set of candidate beams. For example, the UE 115-*a* may review the per-beam, per-component carrier measurements and the per-beam metric each T ms to detect changes in the average per-beam, per-component carrier measurements across all component carriers 210.

The UE 115-*a* may support multi-beam refinement around two or more beams 205. In some cases, the UE 115-*a* may refine the active beam and the beam 205-*a* (e.g., the first UE beam) during alternating SSB occasions. For example, in a mobility scenario (e.g., when the UE 115-*a* is moving through the wireless communications system), the UE 115-*a* may refine the beam 205-*a* during a first SSB occasion, the active beam (e.g., the beam 205-*c*) during a second SSB occasion, the beam 205-*a* during a third SSB occasion, and so on.

Alternative to using average per-beam, per-component carrier measurements to select the active beam, the UE 115-*a* may use maximum and minimum per-beam, per-component carrier measurements. In some examples, the UE 115-*a* may measure maximum and minimum metrics of the beam 205-*a* and all other beams 205 supported by the UE 115-*a* across all component carriers 210. For example, the UE 115-*a* may measure and store maximum and minimum RSRP values and maximum and minimum SNR values for the beam 205-*a*, the beam 205-*b*, and the beam 205-*c* each in the component carrier 210-*a*, the component carrier 210-*b*, and the component carrier 210-*c*. As described herein, the UE 115-*a* may select the beam 205-*a* as the first UE beam based on the maximum and minimum RSRP and SNR measurements corresponding to the beam 205-*a*. In addition, the UE 115-*a* may determine a set of candidate beams based on the first threshold for RSRP and the second threshold for SNR.

In determining the set of candidate beams, the UE 115-*a* may determine respective spread values (e.g., a maximum RSRP minus a minimum RSRP) for each of the one or more beams 205 of the set of candidate beams, where each respective spread value may represent a per-beam difference between a maximum value of the per-beam, per-component carrier measurements for a respective beam 205 and a minimum value of the per-beam, per-component carrier measurements for the respective beam 205. In some examples, the respective spread values may be the per-beam metrics for the beams 205 included in the set of candidate beams. That is, instead of selecting an active beam from the set of candidate beams (e.g., which may include the beam 205-*b* and the beam 205-*c*) and the beam 205-*a* based on a weighted or unweighted average per-beam, per-component carrier measurements, the UE 115-*a* may select the active beam based on the respective spread values of the beam 205-*a*, the beam 205-*b*, and the beam 205-*c*. In some examples, the UE 115-*a* may select the beam 205 that corresponds to a smallest respective spread value of each of the candidate beams and the beam 205-*a* as the active beam (e.g., where the smallest respective spread value may correspond to a minimum distance given as maximum RSRP minus minimum RSRP).

Using the example described above, the UE 115-*a* may obtain the maximum and minimum per-beam, per-component carrier RSRP measurements for each beam 205. For the beam 205-*a* (e.g., the first UE beam), the UE 115-*a* may measure a maximum RSRP value of −84 dB on the component carrier 210-*b* and a minimum RSRP value of −86 dB on the component carrier 210-*a*. For the beam 205-*c*, the UE 115-*a* may measure a maximum RSRP value of −83 dB on the component carrier 210-*a* and a minimum RSRP value of −86 dB on the component carrier 210-*c*. Using the first threshold, the UE 115-*a* may determine that the beam 205-*b* and the beam 205-*c* may be included in the set of candidate beams.

In addition, using the respective spread values as the per-beam metric, the UE 115-*a* may calculate a spread value for each beam 205 included in the set of candidate beams and the beam 205-*a*. For example, using the maximum and minimum per-beam, per-component carrier RSRP measurements, the UE 115-*a* may calculate a respective spread value (e.g., a minimum distance between maximum and minimum RSRP values) of 10 dB for the beam 205-*a*, 2 dB for the beam 205-*b*, and 3 dB for the beam 205-*c*. The UE 115-*a* may identify that the beam 205-*b* has the smallest respective spread value among all of beams 205 that were measured. Accordingly, the UE 115-*a* may select the beam 205-*b* as the active beam on the component carrier 210-*b* (e.g., the component carrier 210 on which the beam 205-*b* has the maximum RSRP value) for communicating with the network entity.

In some examples, the UE 115-*a* may refine the selected active beam (e.g., the beam 205-*b*) to maintain efficient communications with the network entity 105-*a*. In some cases, the UE 115-*a* may refine the active beam according to a periodicity, the refining including re-calculating the respective spread values of each of the one or more beams 205 of the set of candidate beams. For example, the UE 115-*a* may review the per-beam, per-component carrier measurements and the per-beam metric each T ms to detect changes in the respective spread values all component carriers 210. Additionally, or alternatively, the UE 115-*a* may refine the active beam and the beam 205-*a* (e.g., the first UE beam) during alternating SSB occasions. For example, the UE 115-*a* may refine the beam 205-*a* during a first SSB occasion, the active beam (e.g., the beam 205-*b*) during a second SSB occasion, the beam 205-*a* during a third SSB occasion, and so on.

By performing beam selection and refinement for carrier aggregation as described herein, communications between the UE 115-*a* and the network entity 105-*a* may be improved. For example, using the improved beam selection procedures, the UE 115-*a* may select a most performant beam across all supported component carriers 210 rather than just for a PCC, which may improve performance of active beams. In addition, optimized beam refinement around the active beam may improve a readiness of the UE 115-a to adapt to changing environments in the wireless communications system 200. Additionally, the per-beam, per-component carrier measurements may enable the UE 115-a to more efficiently select an active beam across all component carriers 210, which may prevent radio link failure on a given component carrier 210 (e.g., a given component carrier).

Figure 3:
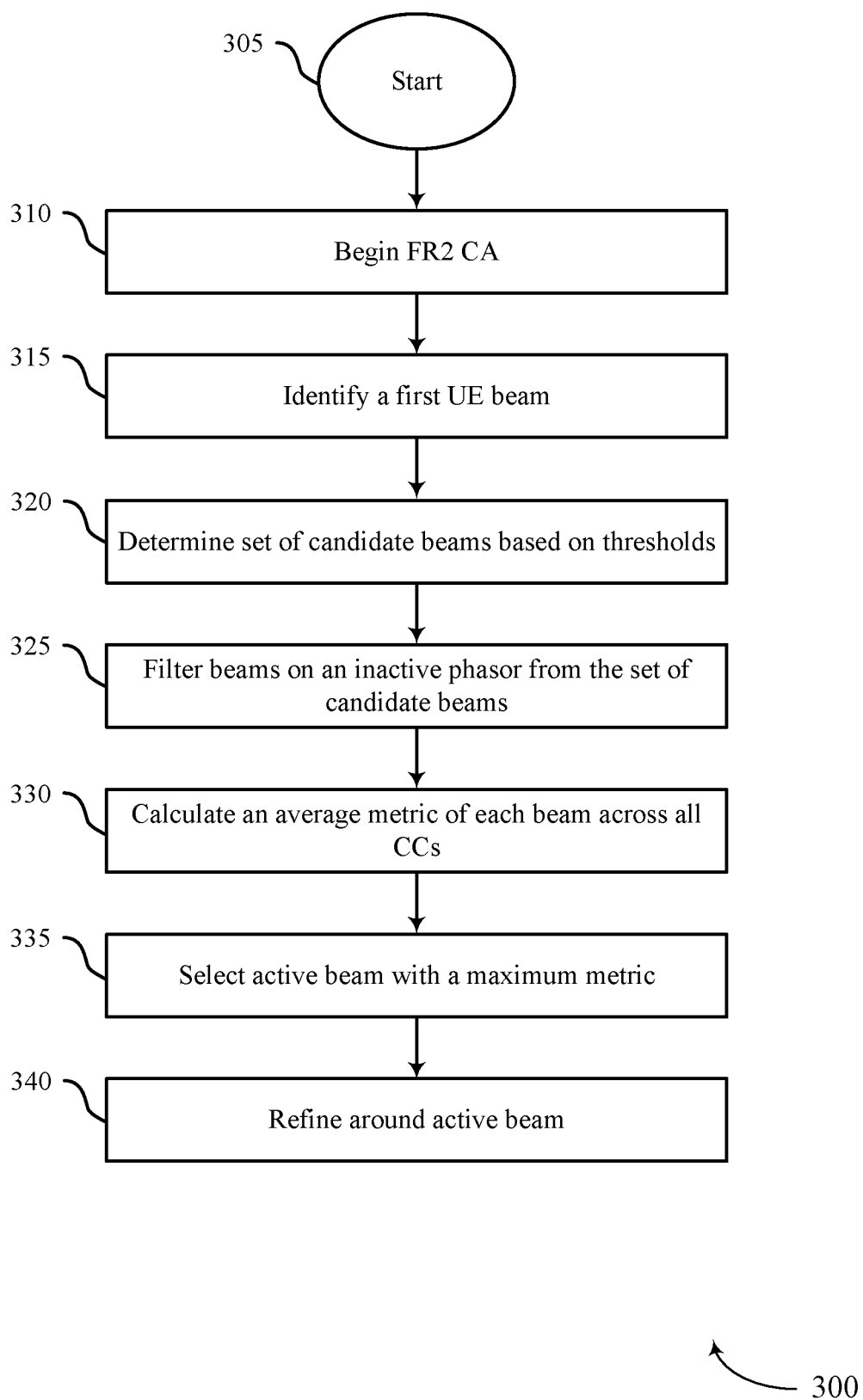
FIG. 3 through 5 illustrate examples of process flows that support UE beam selection and refinement for carrier aggregation in accordance with one or more aspects of the present disclosure.

FIG. 3 illustrates an example of a process flow 300 that supports UE beam selection and refinement for carrier aggregation in accordance with one or more aspects of the present disclosure. In some examples, the process flow 300 may implement aspects of the wireless communications systems 100 and 200 or may be implemented by aspects of the wireless communications systems 100 and 200. For example, a UE may use the process flow 300 to perform beam selection and refinement for FR2 CA.

At 305, a UE may begin a beam selection procedure. The UE may support a set of multiple beams which the UE may use for communications with a network entity on a set of multiple component carriers. In some cases, the UE may perform the beam selection procedure to select an active beam from the set of multiple beams for the communications.

At 310, the UE may begin FR2 CA. The carrier aggregation may enable the UE and a network entity to use more than one carrier frequency wireless communications, which may increase cell coverage for the wireless devices. For example, based on the CA, the UE may communicate with the network entity via the set of multiple component carriers. The set of multiple component carriers may include a PCC and one or more SCCs, which may have different bandwidths.

At 315, the UE may identify a first UE beam (e.g., an anchor beam) that corresponds to a highest per-beam, per-component carrier measurement (e.g., an RSRP measurement, an SNR measurement, an RSRQ measurement, or any combination thereof) among all beams on all component carriers supported by the UE. That is, the UE may measure an RSRP, an SNR, or both for each beam-component carrier combination, and the UE may select the beam with the highest RSRP or SNR measurement on a given beam as the first UE beam.

At 320, the UE may determine a set of candidate beams based on comparing the per-beam, per-component carrier measurements to one or more thresholds. For example, the RSRP measurement of the first UE beam may correspond to a value X1 dB, and the SNR measurement of the first UE beam may correspond to a value Y1 dB. In addition, a value k1 dB may represent an offset from X1 dB, and a value k2 dB may represent an offset from Y1 dB. As such, the UE may define a first threshold as (X1+k1) dB for RSRP measurements, and a second threshold as (Y1+k2) for SNR measurements. The UE may select one or more beams for the set of candidate beams that have a per-beam, per-component carrier RSRP or SNR measurements that are within a respective k1 dB or k2 dB from the RSRP and SNR measurements corresponding to the first UE beam.

At 325, the UE may filter out any beams on an inactive phasor from the set of candidate beams. That is, each beam included in the set of candidate beams may correspond to a same phasor (e.g., an active phasor) as the first UE beam.

At 330, the UE may calculate an average per-beam metric for each beam in the set of candidate beams across all component carriers. The UE may derive the per-beam metric from the multiple per-beam, per-component carrier measurements for each beam. For example, the UE may calculate an average RSRP or SNR for each beam across all component carriers (e.g., PCCs). The average RSRP or SNR measurements may be unweighted, where each component carrier may have an equal weight in the calculation, or weighted, where some component carriers may have a higher priority than others (e.g., based on bandwidths of the component carriers).

At 335, the UE may select an active beam for wireless communication with the network entity. The UE may select the active beam based on the average RSRP and SNR measurements of the first UE beam and each beam in the set of candidate beams, where the active beam may correspond to a highest average RSRP or SNR measurement as compared to the other beams. The UE may communicate with the network entity using the active beam.

At 340, the UE may refine around the active beam. For example, the UE may refine the active beam by re-calculating the average RSRP or SNR measurements for the first UE beam and each beam in the set of candidate beams. In some cases, the UE may refine the active beam and the first UE beam during alternating SSB occasions.

Figure 4:
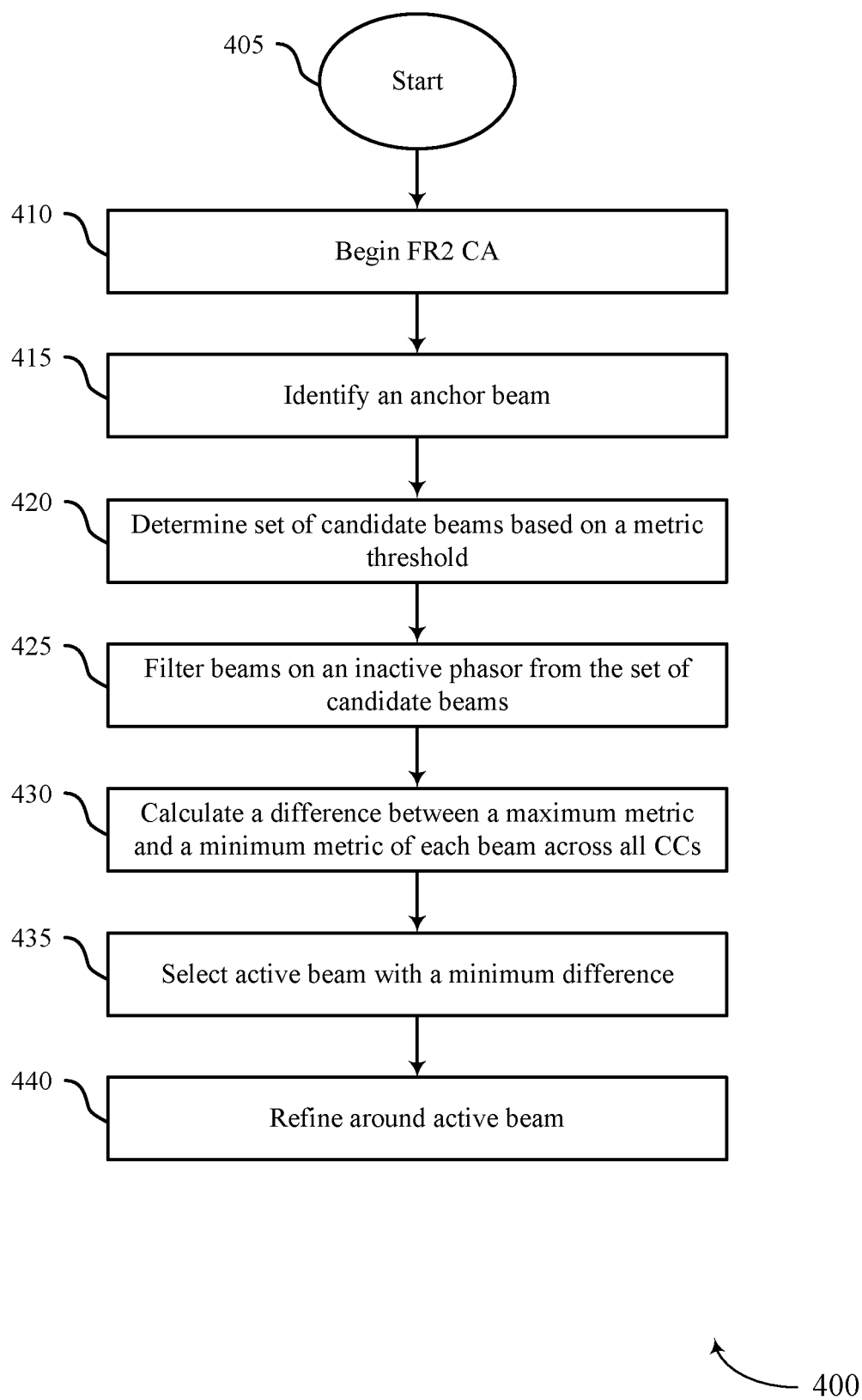

FIG. 4 illustrates an example of a process flow 400 that supports UE beam selection and refinement for carrier aggregation in accordance with one or more aspects of the present disclosure. In some examples, the process flow 400 may implement aspects of the wireless communications systems 100 and 200 or may be implemented by aspects of the wireless communications systems 100 and 200. For example, a UE may use the process flow 400 to perform beam selection and refinement for FR2 CA.

At 405, a UE may begin a beam selection procedure. The UE may support a set of multiple beams which the UE may use for communications with a network entity on a set of multiple component carriers. In some cases, the UE may perform the beam selection procedure to select an active beam from the set of multiple beams for the communications.

At 410, the UE may begin FR2 CA. The carrier aggregation may enable the UE and a network entity to use more than one carrier frequency wireless communications, which may increase cell coverage for the wireless devices. For example, based on the CA, the UE may communicate with the network entity via the set of multiple component carriers. The set of multiple component carriers may include a PCC and one or more SCCs, which may have different bandwidths.

At 415, the UE may identify a first UE beam (e.g., an anchor beam) that corresponds to a highest per-beam, per-component carrier measurement (e.g., an RSRP or an SNR measurement) among all beams on all component carriers supported by the UE. In some cases, the UE may measure maximum and minimum RSRP and SNR values for each beam-component carrier combination, and the UE may select the beam with the highest maximum RSRP or SNR measurement on a given beam as the first UE beam.

At 420, the UE may determine a set of candidate beams based on comparing the maximum per-beam, per-component carrier measurements to one or more thresholds. For example, the maximum RSRP measurement of the first UE beam may correspond to a value X1 dB, and the maximum SNR measurement of the first UE beam may correspond to a value Y1 dB. In addition, a value k1 dB may represent an offset from X1 dB, and a value k2 dB may represent an offset from Y1 dB. As such, the UE may define a first threshold as (X1+k1) dB for maximum RSRP measurements, and a second threshold as (Y1+k2) for maximum SNR measurements. The UE may select one or more beams for the set of candidate beams that have a maximum per-beam, per-component carrier RSRP or SNR measurement that are within a respective k1 dB or k2 dB from the maximum RSRP and SNR measurements corresponding to the first UE beam.

At 425, the UE may filter out any beams on an inactive phasor from the set of candidate beams. That is, each beam included in the set of candidate beams may correspond to a same phasor (e.g., an active phasor) as the first UE beam.

At 430, the UE may calculate a per-beam metric for each beam in the set of candidate beams across all component carriers. The per-beam metric may include a respective spread value, which the UE may derive from the maximum and minimum per-beam, per-component carrier measurements for each beam. For example, the UE may calculate an a respective spread value for each beam across all component carriers (e.g., PCCs), where the respective spread value may represent the difference between a maximum RSRP or SNR value and a minimum RSRP or SNR value for a given beam (e.g., a maximum RSRP or SNR value minus a minimum RSRP or SNR value).

At 435, the UE may select an active beam for wireless communication with the network entity. The UE may select the active beam based on the respective spread values for the first UE beam and each beam in the set of candidate beams, where the active beam may correspond to a smallest respective spread value (e.g., a minimum difference between a maximum RSRP or SNR value and a minimum RSRP or SNR value) as compared to the other beams. The UE may communicate with the network entity using the active beam.

At 440, the UE may refine around the active beam. For example, the UE may refine the active beam by re-calculating the respective spread values for the first UE beam and each beam in the set of candidate beams. In some cases, the UE may refine the active beam and the first UE beam during alternating SSB occasions.

Figure 5:
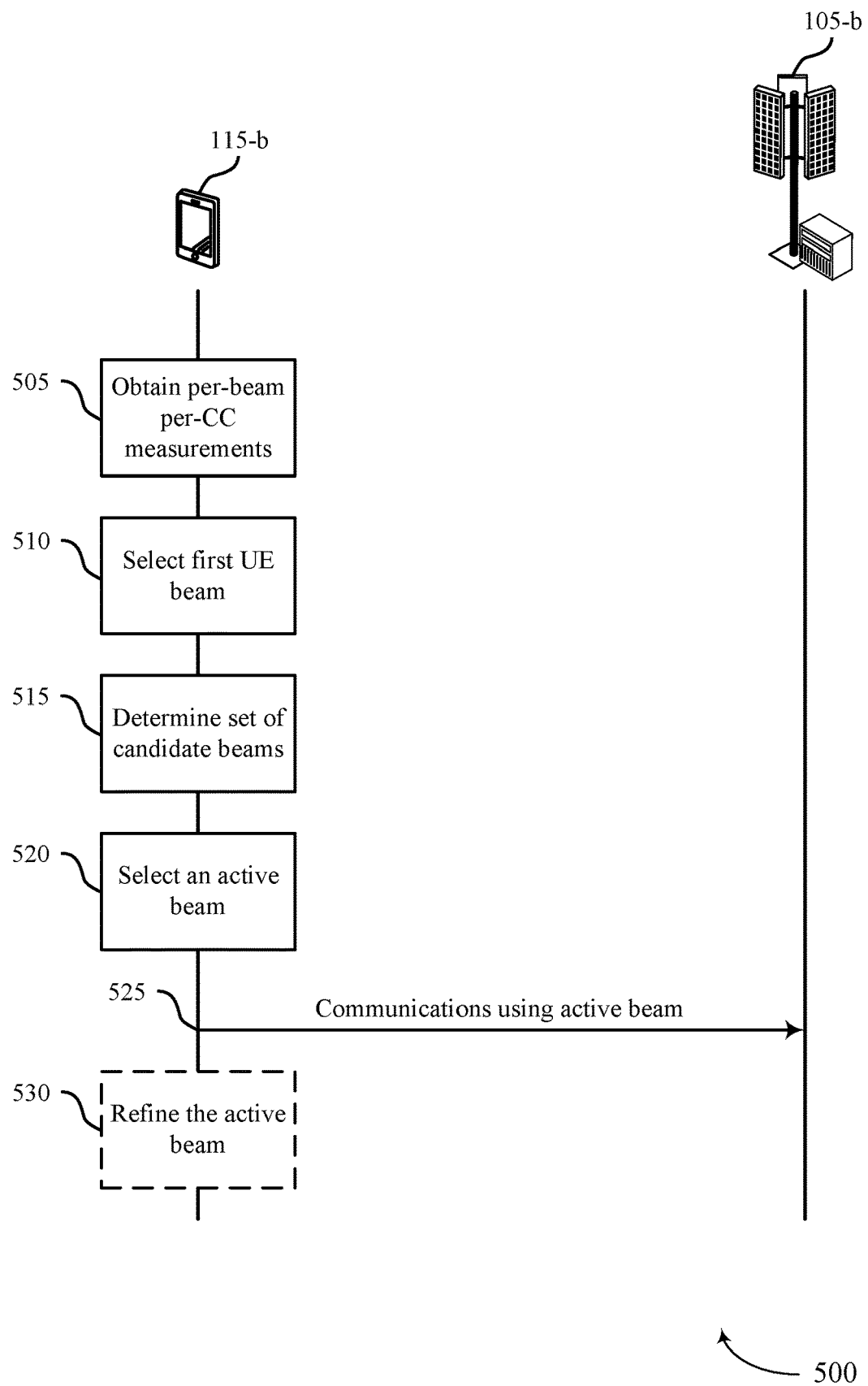

FIG. 5 illustrates an example of a process flow 500 that supports UE beam selection and refinement for carrier aggregation in accordance with one or more aspects of the present disclosure. The process flow 500 may implement aspects of wireless communications systems 100, or may be implemented by aspects of the wireless communications system 100. For example, the process flow 500 may illustrate operations between a UE 115-b and a network entity 105-b, which may be examples of corresponding devices described herein. In the following description of the process flow 500, the operations between the UE 115-b and the network entity 105-b may be transmitted in a different order than the example order shown, or the operations performed by the UE 115-b and the network entity 105-b may be performed in different orders or at different times. Some operations may also be omitted from the process flow 500, and other operations may be added to the process flow 500.

At 505, the UE 115-b may obtaining a set of multiple of per-beam per-component carrier measurements corresponding to unique combinations of individual ones of a set of multiple of UE beams and individual ones of a set of multiple component carriers for wireless communication between the UE 115-b and the network entity 105-b. The per-beam, per-component carrier measurements may include RSRP measurements, SNR measurements, or both.

At 510, the UE 115-b may select a first UE beam from the set of multiple UE beams, the first UE beam selected based on a first value of one of the per-beam, per-component carrier measurements that correspond to the first UE beam. For example, the first UE beam may correspond to a highest RSRP or SNR per-beam, per-component carrier measurement of all beams across all component carriers supported by the UE 115-b.

At 515, the UE 115-b may determine a set of candidate beams as a subset of the set of multiple UE beams having at least one per-beam, per-component carrier measurement that satisfies one or more thresholds. In some examples, a first threshold may correspond to the highest RSRP measurement corresponding to the first UE beam plus or minus an offset of k1 dB, and a second threshold may correspond to the highest SNR measurement corresponding to the first UE beam plus or minus an offset of k2 dB. Accordingly, the beams included in the set of candidate beams may have RSRP or SNR measurements within k1 dB or k2 dB of the highest RSRP or SNR measurements of the first UE beam, respectively.

At 520, the UE 115-b may select, for the wireless communication with the network entity 105-b, an active beam from the set of candidate beams based on a per-beam metric that is derived from multiple per-beam, per-component carrier measurements corresponding to the active beam. In some examples, the per-beam metric may be an average RSRP or SNR measurement of the first UE beam and each beam in the set of candidate beams across all component carriers. Alternatively, the per-beam metric may be a respective spread value of the first UE beam and each beam in the set of candidate beams across all component carriers. A respective spread value may be a difference between a maximum RSRP or SNR value and a minimum RSRP or SNR value for a given beam across all component carriers. Based on which per-beam metric is used, the active beam may correspond to a highest average RSRP or SNR measurement or a smallest respective spread value.

At 525, the UE 115-b may communicate with the network entity 105-b using the active beam. In some examples, the communications using the active beam may be on a component carrier on which the active beam has a highest RSRP or SNR measurement.

At 530, the UE 115-b may refine the active beam according to a periodicity, where the refining may include re-calculating the average RSRP or SNR measurement or the respective spread values for each beam included in the set of candidate beams and the first UE beam. In some examples, the UE 115-b may refine the active beam and the first UE beam during alternating SSB occasions.

Figure 6:
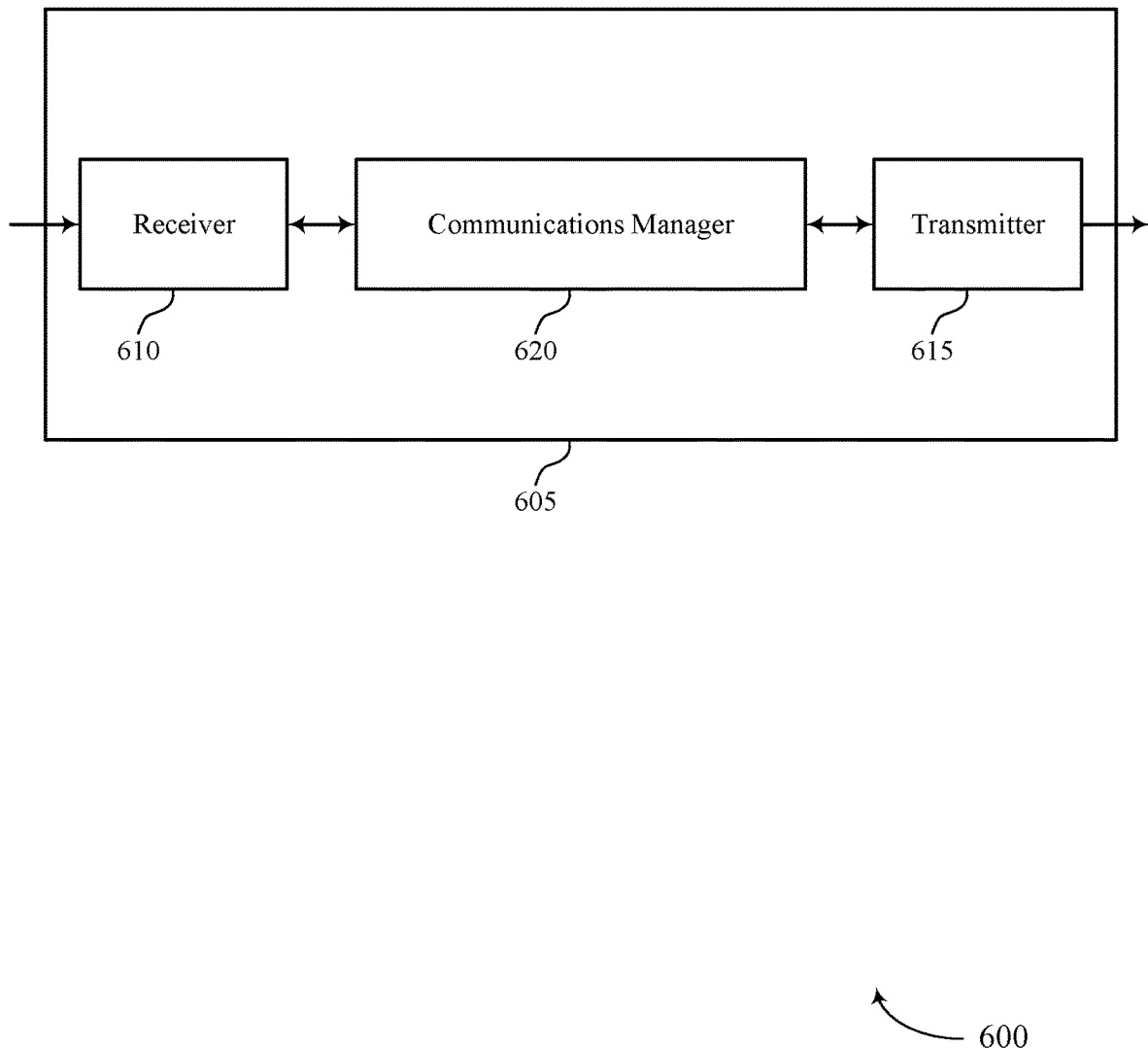
FIGS. 6 and 7 show block diagrams of devices that support UE beam selection and refinement for carrier aggregation in accordance with one or more aspects of the present disclosure.

FIG. 6 shows a block diagram 600 of a device 605 that supports UE beam selection and refinement for carrier aggregation in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to UE beam selection and refinement for CA). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to UE beam selection and refinement for CA). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of UE beam selection and refinement for carrier aggregation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for obtaining a set of multiple per-beam per-component carrier measurements corresponding to unique combinations of individual ones of a set of multiple UE beams and individual ones of a set of multiple component carriers for the wireless communication between the UE and a network entity. The communications manager 620 may be configured as or otherwise support a means for determining a set of candidate beams as a subset of the set of multiple UE beams having at least one per-beam per-component carrier measurement that satisfies one or more thresholds. The communications manager 620 may be configured as or otherwise support a means for selecting, for the wireless communication, an active beam from the set of candidate beams based on a per-beam metric that is derived from multiple per-beam per-component carrier measurements corresponding to the active beam. The communications manager 620 may be configured as or otherwise support a means for communicating with the network entity using the active beam.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for beam selection and refinement in CA, which may increase signaling throughput and performance of communications between a network entity and a UE.

Figure 7:
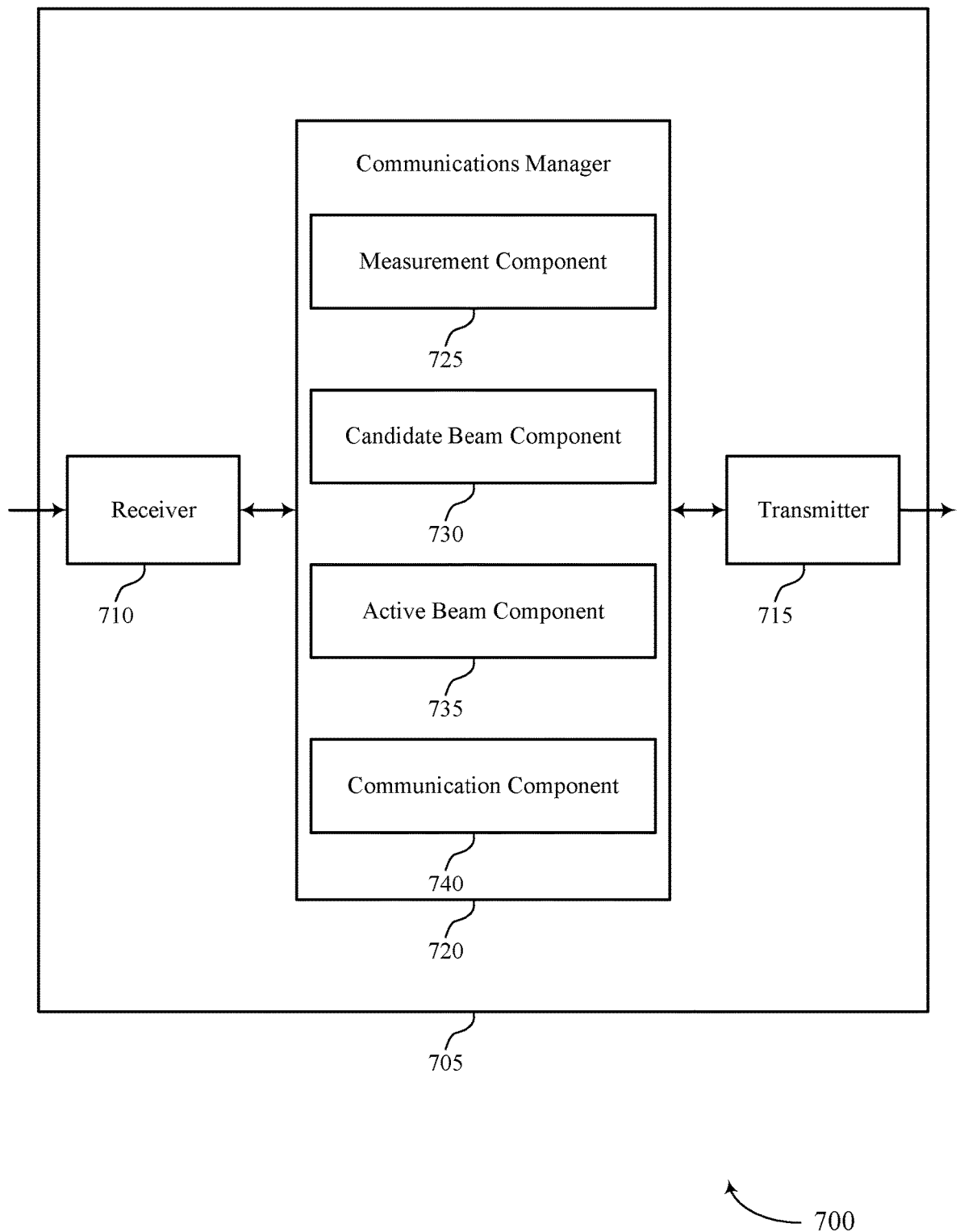

FIG. 7 shows a block diagram 700 of a device 705 that supports UE beam selection and refinement for carrier aggregation in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to UE beam selection and refinement for CA). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to UE beam selection and refinement for CA). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of UE beam selection and refinement for carrier aggregation as described herein. For example, the communications manager 720 may include a measurement component 725, a candidate beam component 730, an active beam component 735, a communication component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The measurement component 725 may be configured as or otherwise support a means for obtaining a set of multiple per-beam per-component carrier measurements corresponding to unique combinations of individual ones of a set of multiple UE beams and individual ones of a set of multiple component carriers for the wireless communication between the UE and a network entity. The candidate beam component 730 may be configured as or otherwise support a means for determining a set of candidate beams as a subset of the set of multiple UE beams having at least one per-beam per-component carrier measurement that satisfies one or more thresholds. The active beam component 735 may be configured as or otherwise support a means for selecting, for the wireless communication, an active beam from the set of candidate beams based on a per-beam metric that is derived from multiple per-beam per-component carrier measurements corresponding to the active beam. The communication component 740 may be configured as or otherwise support a means for communicating with the network entity using the active beam.

Figure 8:
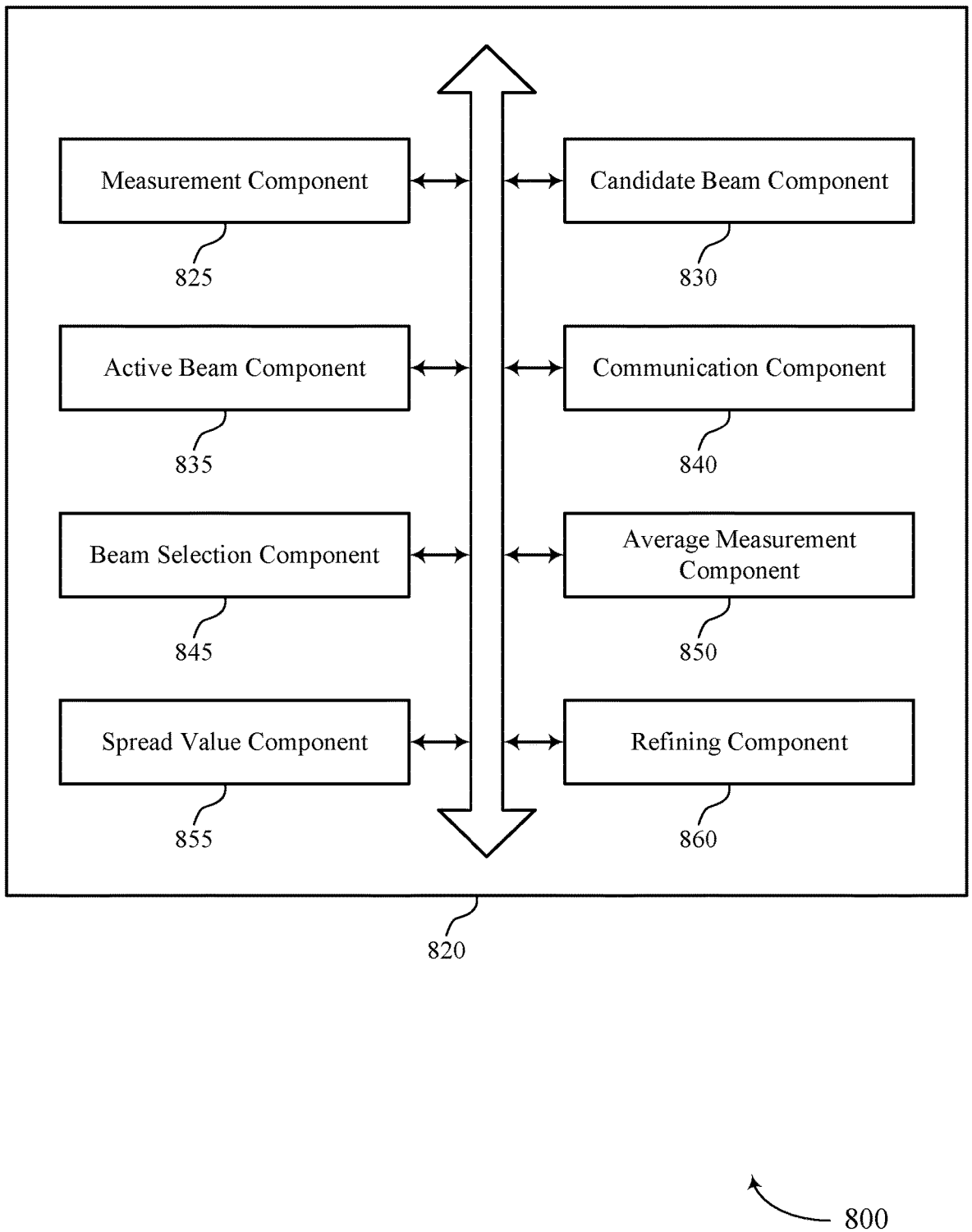
FIG. 8 shows a block diagram of a communications manager that supports UE beam selection and refinement for carrier aggregation in accordance with one or more aspects of the present disclosure.

FIG. 8 shows a block diagram 800 of a communications manager 820 that supports UE beam selection and refinement for carrier aggregation in accordance with one or more aspects of the present disclosure. The communications manager 820 may be an example of aspects of a communications manager 620, a communications manager 720, or both, as described herein. The communications manager 820, or various components thereof, may be an example of means for performing various aspects of UE beam selection and refinement for carrier aggregation as described herein. For example, the communications manager 820 may include a measurement component 825, a candidate beam component 830, an active beam component 835, a communication component 840, a beam selection component 845, an average measurement component 850, a spread value component 855, a refining component 860, or any combination thereof. Each of these components may communicate, directly or indirectly, with one another (e.g., via one or more buses).

The communications manager 820 may support wireless communication at a UE in accordance with examples as disclosed herein. The measurement component 825 may be configured as or otherwise support a means for obtaining a set of multiple per-beam per-component carrier measurements corresponding to unique combinations of individual ones of a set of multiple UE beams and individual ones of a set of multiple component carriers for the wireless communication between the UE and a network entity. The candidate beam component 830 may be configured as or otherwise support a means for determining a set of candidate beams as a subset of the set of multiple UE beams having at least one per-beam per-component carrier measurement that satisfies one or more thresholds. The active beam component 835 may be configured as or otherwise support a means for selecting, for the wireless communication, an active beam from the set of candidate beams based on a per-beam metric that is derived from multiple per-beam per-component carrier measurements corresponding to the active beam. The communication component 840 may be configured as or otherwise support a means for communicating with the network entity using the active beam.

In some examples, to support determining the set of candidate beams, the beam selection component 845 may be configured as or otherwise support a means for selecting a first UE beam from the set of multiple UE beams, the first UE beam selected based on a first value of one of the per-beam per-component carrier measurements that correspond to the first UE beam. In some examples, to support determining the set of candidate beams, the candidate beam component 830 may be configured as or otherwise support a means for determining the set of candidate beams as the subset of the set of multiple UE beams that have at least one respective second value of the per-beam per-component carrier measurements that are within a range of the one or more thresholds with respect to the first value.

In some examples, the first value and the respective second values are lowest decibel measurements of the per-beam per-component carrier measurements for the first UE beam and for the one or more of the set of multiple UE beams other than the first UE beam, respectively. In some examples, each candidate beam of the set of candidate beams corresponds to a same phasor as the first UE beam.

In some examples, the average measurement component 850 may be configured as or otherwise support a means for determining the per-beam metric for each of one or more beams of the set of candidate beams based on an average measurement of the per-beam per-component carrier measurements corresponding to each of the one or more beams of the set of candidate beams, where the active beam is selected from the set of candidate beams based on the average measurement of each of the one or more beams of the set of candidate beams.

In some examples, the refining component 860 may be configured as or otherwise support a means for refining the active beam according to a periodicity, where the refining includes re-calculating the average measurement of each of the one or more beams of the set of candidate beams.

In some examples, to support refining the active beam, the refining component 860 may be configured as or otherwise support a means for refining the active beam and the first UE beam during alternating SSB occasions.

In some examples, to support selecting the active beam from the set of candidate beams, the active beam component 835 may be configured as or otherwise support a means for selecting, as the active beam, one of the one or more of the set of multiple UE beams other than the first UE beam.

In some examples, the spread value component 855 may be configured as or otherwise support a means for determining respective spread values for each of one or more beams of the set of candidate beams, where each of the respective spread values represents a per-beam difference between a maximum value of the per-beam per-component carrier measurements for a respective beam and a minimum value of the per-beam per-component carrier measurements for the respective beam, where the respective spread values are the per-beam metrics for the one or more beams of the set of candidate beams. In some examples, the per-beam metric of the active beam includes a smallest respective spread value of each of one or more beams of the set of candidate beams.

In some examples, the refining component 860 may be configured as or otherwise support a means for refining the active beam according to a periodicity, where the refining includes re-calculating the respective spread values for each of one or more beams of the set of candidate beams.

In some examples, to support refining the active beam, the refining component 860 may be configured as or otherwise support a means for refining the active beam and the first UE beam during alternating SSB occasions.

In some examples, to support selecting the active beam, the active beam component 835 may be configured as or otherwise support a means for applying a per-candidate beam weight to the per-beam metric for each of the one or more beams of the set of candidate beams.

In some examples, the per-candidate beam weight is based on respective bandwidths of one or more component carriers corresponding to the set of candidate beams. In some examples, the set of multiple per-beam per-component carrier measurements includes a set of multiple RSRP measurements, a set of multiple SNR measurements, a set of multiple RSRQ measurements, or any combination thereof.

Figure 9:
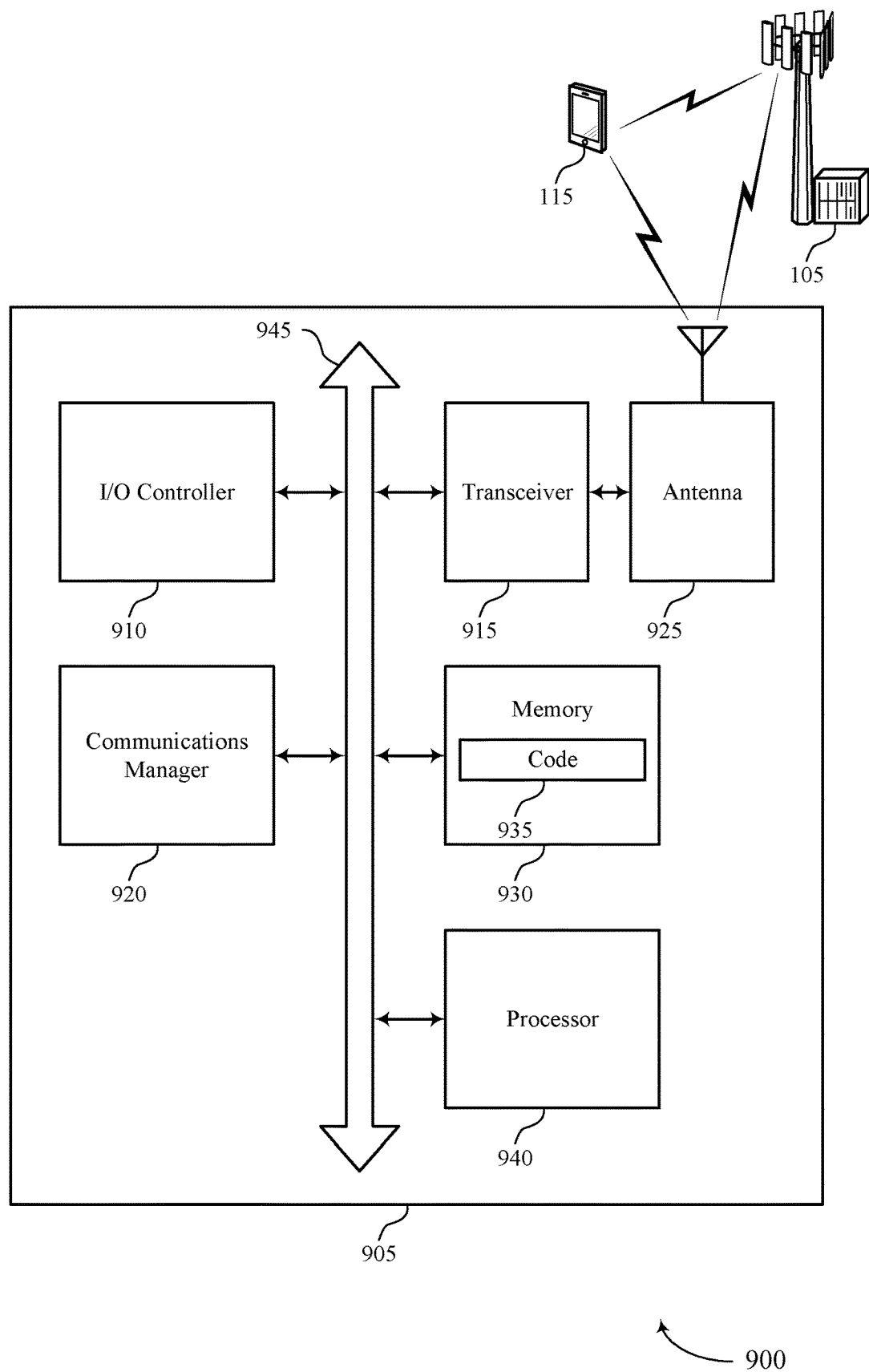
FIG. 9 shows a diagram of a system including a device that supports UE beam selection and refinement for carrier aggregation in accordance with one or more aspects of the present disclosure.

FIG. 9 shows a diagram of a system 900 including a device 905 that supports UE beam selection and refinement for carrier aggregation in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting UE beam selection and refinement for CA). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for obtaining a set of multiple per-beam per-component carrier measurements corresponding to unique combinations of individual ones of a set of multiple UE beams and individual ones of a set of multiple component carriers for the wireless communication between the UE and a network entity. The communications manager 920 may be configured as or otherwise support a means for determining a set of candidate beams as a subset of the set of multiple UE beams having at least one per-beam per-component carrier measurement that satisfies one or more thresholds. The communications manager 920 may be configured as or otherwise support a means for selecting, for the wireless communication, an active beam from the set of candidate beams based on a per-beam metric that is derived from multiple per-beam per-component carrier measurements corresponding to the active beam. The communications manager 920 may be configured as or otherwise support a means for communicating with the network entity using the active beam.

By including or configuring the communications manager 920 in accordance with examples as described herein, the device 905 may support techniques for beam selection and refinement in CA, which may increase signaling throughput and performance of communications between a network entity and a UE.

Figure 10:
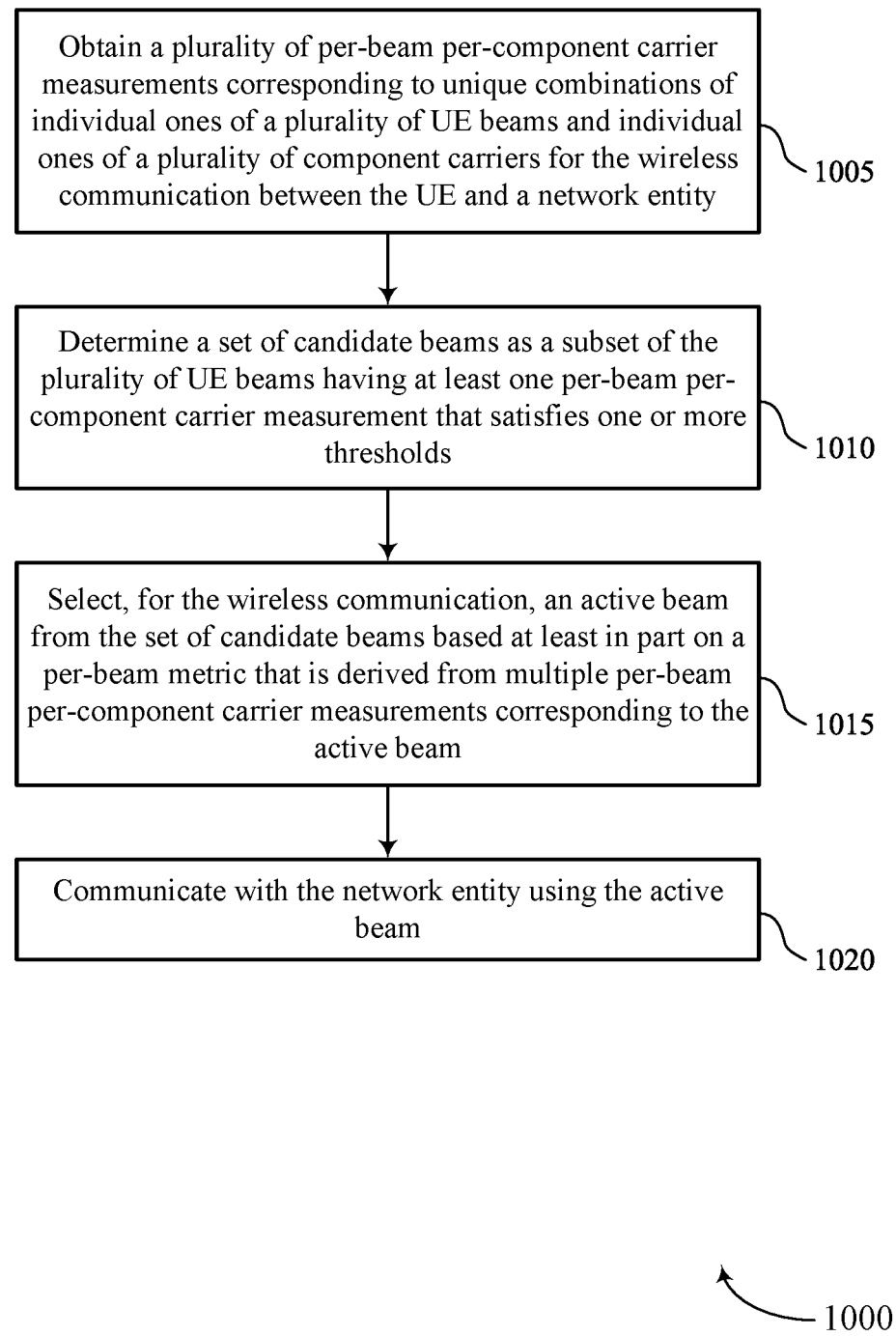
FIGS. 10 through 12 show flowcharts illustrating methods that support UE beam selection and refinement for carrier aggregation in accordance with one or more aspects of the present disclosure.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of UE beam selection and refinement for carrier aggregation as described herein, or the processor 940 and the memory 930 may be otherwise configured to perform or support such operations.

FIG. 10 shows a flowchart illustrating a method 1000 that supports UE beam selection and refinement for carrier aggregation in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include obtaining a set of multiple per-beam per-component carrier measurements corresponding to unique combinations of individual ones of a set of multiple UE beams and individual ones of a set of multiple component carriers for the wireless communication between the UE and a network entity. The operations of 1005 may be performed in accordance with examples as disclosed herein. In some examples, aspects of the operations of 1005 may be performed by a measurement component 825 as described with reference to FIG. 8.

At 1010, the method may include determining a set of candidate beams as a subset of the set of multiple UE beams having at least one per-beam per-component carrier measurement that satisfies one or more thresholds. The operations of 1010 may be performed in accordance with examples as disclosed herein. In some examples, aspects of the operations of 1010 may be performed by a candidate beam component 830 as described with reference to FIG. 8.

At 1015, the method may include selecting, for the wireless communication, an active beam from the set of candidate beams based on a per-beam metric that is derived from multiple per-beam per-component carrier measurements corresponding to the active beam. The operations of 1015 may be performed in accordance with examples as disclosed herein. In some examples, aspects of the operations of 1015 may be performed by an active beam component 835 as described with reference to FIG. 8.

At 1020, the method may include communicating with the network entity using the active beam. The operations of 1020 may be performed in accordance with examples as disclosed herein. In some examples, aspects of the operations of 1020 may be performed by a communication component 840 as described with reference to FIG. 8.

Figure 11:
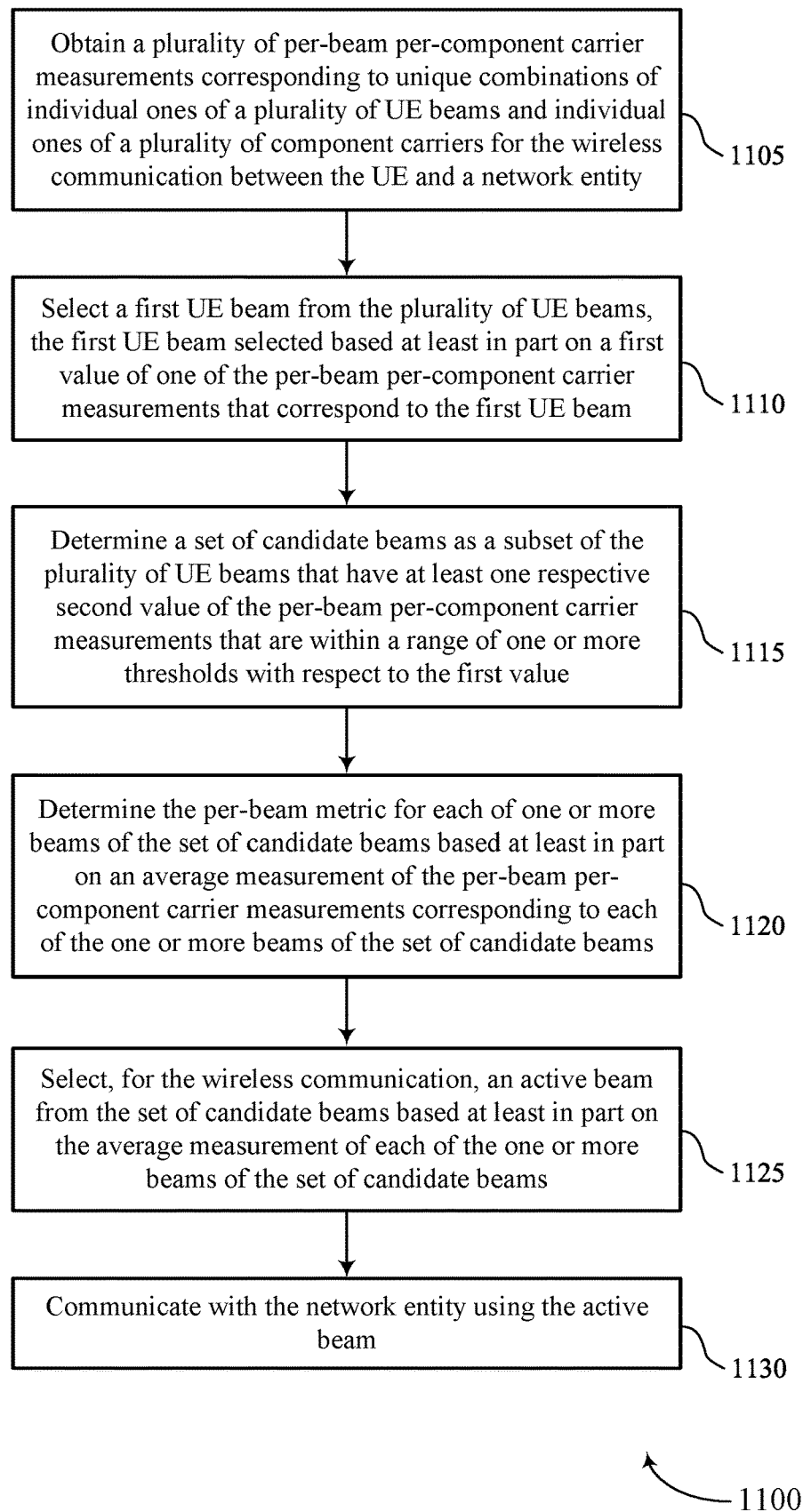

FIG. 11 shows a flowchart illustrating a method 1100 that supports UE beam selection and refinement for carrier aggregation in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include obtaining a set of multiple per-beam per-component carrier measurements corresponding to unique combinations of individual ones of a set of multiple UE beams and individual ones of a set of multiple component carriers for the wireless communication between the UE and a network entity. The operations of 1105 may be performed in accordance with examples as disclosed herein. In some examples, aspects of the operations of 1105 may be performed by a measurement component 825 as described with reference to FIG. 8.

At 1110, the method may include selecting a first UE beam from the set of multiple UE beams, the first UE beam selected based on a first value of one of the per-beam per-component carrier measurements that correspond to the first UE beam. The operations of 1110 may be performed in accordance with examples as disclosed herein. In some examples, aspects of the operations of 1110 may be performed by a beam selection component 845 as described with reference to FIG. 8.

At 1115, the method may include determining a set of candidate beams as a subset of the set of multiple UE beams that have at least one respective second value of the per-beam per-component carrier measurements that are within a range of one or more thresholds with respect to the first value. The operations of 1115 may be performed in accordance with examples as disclosed herein. In some examples, aspects of the operations of 1115 may be performed by a candidate beam component 830 as described with reference to FIG. 8.

At 1120, the method may include determining the per-beam metric for each of one or more beams of the set of candidate beams based on an average measurement of the per-beam per-component carrier measurements corresponding to each of the one or more beams of the set of candidate beams. The operations of 1120 may be performed in accordance with examples as disclosed herein. In some examples, aspects of the operations of 1120 may be performed by an average measurement component 850 as described with reference to FIG. 8.

At 1125, the method may include selecting, for the wireless communication, an active beam from the set of candidate beams based on the average measurement of each of the one or more beams of the set of candidate beams. The operations of 1125 may be performed in accordance with examples as disclosed herein. In some examples, aspects of the operations of 1125 may be performed by an active beam component 835 as described with reference to FIG. 8.

At 1130, the method may include communicating with the network entity using the active beam. The operations of 1130 may be performed in accordance with examples as disclosed herein. In some examples, aspects of the operations of 1130 may be performed by a communication component 840 as described with reference to FIG. 8.

Figure 12:
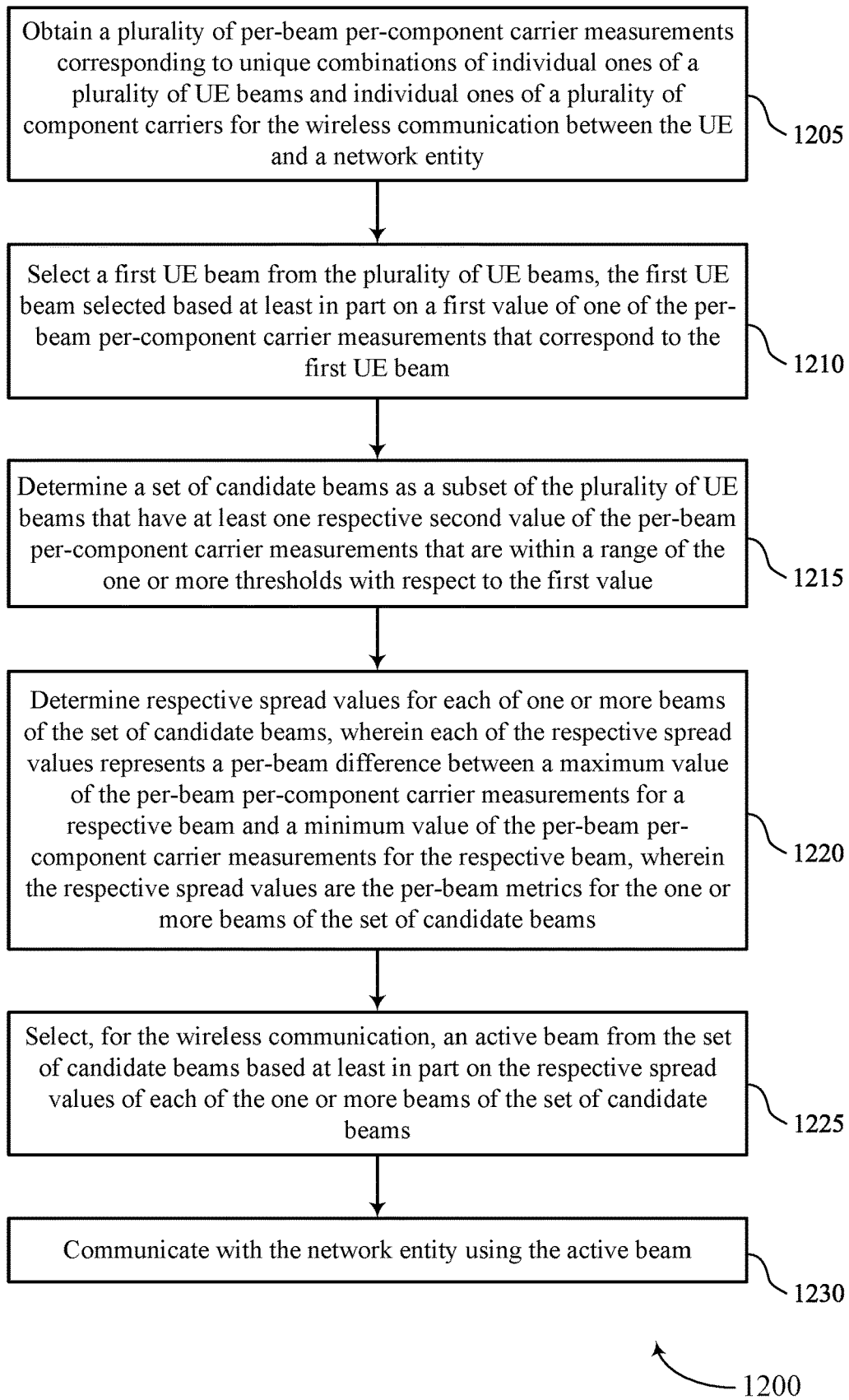

FIG. 12 shows a flowchart illustrating a method 1200 that supports UE beam selection and refinement for carrier aggregation in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include obtaining a set of multiple per-beam per-component carrier measurements corresponding to unique combinations of individual ones of a set of multiple UE beams and individual ones of a set of multiple component carriers for the wireless communication between the UE and a network entity. The operations of 1205 may be performed in accordance with examples as disclosed herein. In some examples, aspects of the operations of 1205 may be performed by a measurement component 825 as described with reference to FIG. 8.

At 1210, the method may include selecting a first UE beam from the set of multiple UE beams, the first UE beam selected based on a first value of one of the per-beam per-component carrier measurements that correspond to the first UE beam. The operations of 1210 may be performed in accordance with examples as disclosed herein. In some examples, aspects of the operations of 1210 may be performed by a beam selection component 845 as described with reference to FIG. 8.

At 1215, the method may include determining a set of candidate beams as a subset of the set of multiple UE beams that have at least one respective second value of the per-beam per-component carrier measurements that are within a range of the one or more thresholds with respect to the first value. The operations of 1215 may be performed in accordance with examples as disclosed herein. In some examples, aspects of the operations of 1215 may be performed by a candidate beam component 830 as described with reference to FIG. 8.

At 1220, the method may include determining respective spread values for each of one or more beams of the set of candidate beams, where each of the respective spread values represents a per-beam difference between a maximum value of the per-beam per-component carrier measurements for a respective beam and a minimum value of the per-beam per-component carrier measurements for the respective beam, where the respective spread values are the per-beam metrics for the one or more beams of the set of candidate beams. The operations of 1220 may be performed in accordance with examples as disclosed herein. In some examples, aspects of the operations of 1220 may be performed by a spread value component 855 as described with reference to FIG. 8.

At 1225, the method may include selecting, for the wireless communication, an active beam from the set of candidate beams based on the respective spread values of each of the one or more beams of the set of candidate beams. The operations of 1225 may be performed in accordance with examples as disclosed herein. In some examples, aspects of the operations of 1225 may be performed by an active beam component 835 as described with reference to FIG. 8.

At 1230, the method may include communicating with the network entity using the active beam. The operations of 1230 may be performed in accordance with examples as disclosed herein. In some examples, aspects of the operations of 1230 may be performed by a communication component 840 as described with reference to FIG. 8.

The following provides an overview of aspects of the present disclosure:

Aspect 1: A method for wireless communication at a UE, comprising: obtaining a plurality of per-beam per-component carrier measurements corresponding to unique combinations of individual ones of a plurality of UE beams and individual ones of a plurality of component carriers for the wireless communication between the UE and a network entity; determining a set of candidate beams as a subset of the plurality of UE beams having at least one per-beam per-component carrier measurement that satisfies one or more thresholds; selecting, for the wireless communication, an active beam from the set of candidate beams based at least in part on a per-beam metric that is derived from multiple per-beam per-component carrier measurements corresponding to the active beam; and communicating with the network entity using the active beam.

Aspect 2: The method of aspect 1, wherein determining the set of candidate beams further comprises: selecting a first UE beam from the plurality of UE beams, the first UE beam selected based at least in part on a first value of one of the per-beam per-component carrier measurements that correspond to the first UE beam; and determining the set of candidate beams as the subset of the plurality of UE beams that have at least one respective second value of the per-beam per-component carrier measurements that are within a range of the one or more thresholds with respect to the first value.

Aspect 3: The method of aspect 2, wherein the first value and the respective second values are lowest decibel measurements of the per-beam per-component carrier measurements for the first UE beam and for the one or more of the plurality of UE beams other than the first UE beam, respectively.

Aspect 4: The method of any of aspects 2 through 3, wherein each candidate beam of the set of candidate beams corresponds to a same phasor as the first UE beam.

Aspect 5: The method of any of aspects 2 through 4, further comprising: determining the per-beam metric for each of one or more beams of the set of candidate beams based at least in part on an average measurement of the per-beam per-component carrier measurements corresponding to each of the one or more beams of the set of candidate beams, wherein the active beam is selected from the set of candidate beams based at least in part on the average measurement of each of the one or more beams of the set of candidate beams.

Aspect 6: The method of aspect 5, further comprising: refining the active beam according to a periodicity, wherein the refining comprises re-calculating the average measurement of each of the one or more beams of the set of candidate beams.

Aspect 7: The method of aspect 6, wherein refining the active beam comprises: refining the active beam and the first UE beam during alternating SSB occasions.

Aspect 8: The method of any of aspects 5 through 7, wherein selecting the active beam from the set of candidate beams further comprises: selecting, as the active beam, one of the one or more of the plurality of UE beams other than the first UE beam.

Aspect 9: The method of any of aspects 2 through 8, further comprising: determining respective spread values for each of one or more beams of the set of candidate beams, wherein each of the respective spread values represents a per-beam difference between a maximum value of the per-beam per-component carrier measurements for a respective beam and a minimum value of the per-beam per-component carrier measurements for the respective beam, wherein the respective spread values are the per-beam metrics for the one or more beams of the set of candidate beams.

Aspect 10: The method of aspect 9, wherein the per-beam metric of the active beam includes a smallest respective spread value of each of one or more beams of the set of candidate beams.

Aspect 11: The method of any of aspects 9 through 10, further comprising: refining the active beam according to a periodicity, wherein the refining comprises re-calculating the respective spread values for each of one or more beams of the set of candidate beams.

Aspect 12: The method of aspect 11, wherein refining the active beam comprises: refining the active beam and the first UE beam during alternating SSB occasions.

Aspect 13: The method of any of aspects 2 through 12, wherein selecting the active beam further comprises: applying a per-candidate beam weight to the per-beam metric for each of the one or more beams of the set of candidate beams.

Aspect 14: The method of aspect 13, wherein the per-candidate beam weight is based at least in part on respective bandwidths of one or more component carriers corresponding to the set of candidate beams.

Aspect 15: The method of any of aspects 1 through 14, wherein the plurality of per-beam per-component carrier measurements comprises a plurality of RSRP measurements, a plurality of SNR measurements, a plurality of RSRQ measurements, or any combination thereof.

Aspect 16: An apparatus for wireless communication at a UE, comprising a processor; memory coupled with the processor; and instructions stored in the memory and executable by the processor to cause the apparatus to perform a method of any of aspects 1 through 15.

Aspect 17: An apparatus for wireless communication at a UE, comprising at least one means for performing a method of any of aspects 1 through 15.

Aspect 18: A non-transitory computer-readable medium storing code for wireless communication at a UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   obtaining a plurality of per-beam per-component carrier measurements corresponding to unique combinations of individual ones of a plurality of UE beams and individual ones of a plurality of component carriers for the wireless communication between the UE and a network entity, the plurality of component carriers comprising at least a primary component carrier (PCC) and a secondary component carrier (SCC);
   determining a set of candidate beams as a subset of the plurality of UE beams having at least one per-beam per-component carrier measurement that satisfies one or more thresholds;
   selecting, for the wireless communication via the plurality of component carriers, an active beam from the set of candidate beams based at least in part on a per-beam metric that is derived from multiple per-beam per-component carrier measurements associated with the plurality of component carriers and corresponding to the active beam, wherein selecting the active beam is based at least in part on applying a per-candidate beam weight to the per-beam metric for each of one or more beams of the set of candidate beams, wherein the per-candidate beam weight is based at least in part on respective bandwidths of one or more component carriers corresponding to the set of candidate beams; and
   communicating with the network entity via the plurality of component carriers using the active beam.

2. The method of claim 1, wherein determining the set of candidate beams further comprises:
   selecting a first UE beam from the plurality of UE beams, the first UE beam selected based at least in part on a first value of one of the plurality of per-beam per-component carrier measurements that correspond to the first UE beam; and
   determining the set of candidate beams as the subset of the plurality of UE beams that have at least one respective second value of the plurality of per-beam per-component carrier measurements that are within a range of the one or more thresholds with respect to the first value.

3. The method of claim 2, wherein the first value and the respective second values correspond to decibel measurements of the plurality of per-beam per-component carrier measurements for the first UE beam and for one or more of the plurality of UE beams other than the first UE beam, respectively.

4. The method of claim 2, wherein each candidate beam of the set of candidate beams corresponds to a same phasor as the first UE beam.

5. The method of claim 2, further comprising:
   determining the per-beam metric for each of one or more beams of the set of candidate beams based at least in part on an average measurement of the plurality of per-beam per-component carrier measurements corresponding to each of the one or more beams of the set of candidate beams, wherein the active beam is selected from the set of candidate beams based at least in part on the average measurement of each of the one or more beams of the set of candidate beams.

6. The method of claim 5, further comprising:
   refining the active beam according to a periodicity, wherein the refining comprises re-calculating the average measurement of each of the one or more beams of the set of candidate beams.

7. The method of claim 6, wherein refining the active beam comprises:
   refining the active beam and the first UE beam during alternating synchronization signal block occasions.

8. The method of claim 5, wherein selecting the active beam from the set of candidate beams further comprises:
   selecting, as the active beam, one of the plurality of UE beams other than the first UE beam.

9. The method of claim 2, further comprising:
   determining respective spread values for each of one or more beams of the set of candidate beams, wherein each of the respective spread values represents a per-beam difference between a maximum value and a minimum value of the plurality of per-beam per-component carrier measurements for each respective beam of the set of candidate beams, wherein the respective spread values correspond to respective per-beam metrics for each of the one or more beams of the set of candidate beams.

10. The method of claim 9, wherein the per-beam metric of the active beam includes a smallest respective spread value of the respective spread values of the one or more beams of the set of candidate beams.

11. The method of claim 9, further comprising:
    refining the active beam according to a periodicity, wherein the refining comprises re-calculating the respective spread values for each of the one or more beams of the set of candidate beams.

12. The method of claim 11, wherein refining the active beam comprises:
    refining the active beam and the first UE beam during alternating synchronization signal block occasions.

13. The method of claim 1, wherein the plurality of per-beam per-component carrier measurements comprises at least one of: a plurality of reference signal received power measurements; a plurality of signal-to-noise ratio measurements; or a plurality of reference signal received quality measurements.

14. A user equipment (UE), comprising:
    at least one processor;
    at least one memory coupled with the at least one processor; and instructions stored in the at least one memory and executable by the at least one processor to cause the UE to:
obtain a plurality of per-beam per-component carrier measurements corresponding to unique combinations of individual ones of a plurality of UE beams and individual ones of a plurality of component carriers for wireless communication between the UE and a network entity, the plurality of component carriers comprising at least a primary component carrier (PCC) and a secondary component carrier (SCC);
determine a set of candidate beams as a subset of the plurality of UE beams having at least one per-beam per-component carrier measurement that satisfies one or more thresholds;
select, for the wireless communication via the plurality of component carriers, an active beam from the set of candidate beams based at least in part on a per-beam metric that is derived from multiple per-beam per-component carrier measurements associated with the plurality of component carriers and corresponding to the active beam, wherein the active beam is selected based at least in part on application of a per-candidate beam weight to the per-beam metric for each of one or more beams of the set of candidate beams, wherein the per-candidate beam weight is based at least in part on respective bandwidths of one or more component carriers corresponding to the set of candidate beams; and
communicate with the network entity via the plurality of component carriers using the active beam.

15. The UE of claim 14, wherein the instructions to determine the set of candidate beams are further executable by the at least one processor to cause the UE to:
select a first UE beam from the plurality of UE beams, the first UE beam selected based at least in part on a first value of one of the plurality of per-beam per-component carrier measurements that correspond to the first UE beam; and
determine the set of candidate beams as the subset of the plurality of UE beams that have at least one respective second value of the plurality of per-beam per-component carrier measurements that are within a range of the one or more thresholds with respect to the first value.

16. The UE of claim 15, wherein the first value and the respective second values correspond to decibel measurements of the plurality of per-beam per-component carrier measurements for the first UE beam and for one or more of the plurality of UE beams other than the first UE beam, respectively.

17. The UE of claim 15, wherein each candidate beam of the set of candidate beams corresponds to a same phasor as the first UE beam.

18. The UE of claim 15, wherein the instructions are further executable by the at least one processor to cause the UE to:
determine the per-beam metric for each of one or more beams of the set of candidate beams based at least in part on an average measurement of the plurality of per-beam per-component carrier measurements corresponding to each of the one or more beams of the set of candidate beams, wherein the active beam is selected from the set of candidate beams based at least in part on the average measurement of each of the one or more beams of the set of candidate beams.

19. The UE of claim 18, wherein the instructions are further executable by the at least one processor to cause the UE to:
refine the active beam according to a periodicity, wherein the refining comprises re-calculating the average measurement of each of the one or more beams of the set of candidate beams.

20. The UE of claim 19, wherein the instructions to refine the active beam are executable by the at least one processor to cause the UE to:
refine the active beam and the first UE beam during alternating synchronization signal block occasions.

21. The UE of claim 18, wherein the instructions to select the active beam from the set of candidate beams are further executable by the at least one processor to cause the UE to:
select, as the active beam, one of the plurality of UE beams other than the first UE beam.

22. The UE of claim 15, wherein the instructions are further executable by the at least one processor to cause the UE to:
determine respective spread values for each of one or more beams of the set of candidate beams, wherein each of the respective spread values represents a per-beam difference between a maximum value and a minimum value of the plurality of per-beam per-component carrier measurements for each respective beam of the set of candidate beams, wherein the respective spread values correspond to respective per-beam metrics for each of the one or more beams of the set of candidate beams.

23. The UE of claim 22, wherein the per-beam metric of the active beam includes a smallest respective spread value of the respective spread values of the one or more beams of the set of candidate beams.

24. The UE of claim 22, wherein the instructions are further executable by the at least one processor to cause the UE to:
refine the active beam according to a periodicity, wherein the refining comprises re-calculating the respective spread values for each of the one or more beams of the set of candidate beams.

25. The UE of claim 24, wherein the instructions to refine the active beam are executable by the at least one processor to cause the UE to:
refine the active beam and the first UE beam during alternating synchronization signal block occasions.

26. A user equipment (UE), comprising:
means for obtaining a plurality of per-beam per-component carrier measurements corresponding to unique combinations of individual ones of a plurality of UE beams and individual ones of a plurality of component carriers for wireless communication between the UE and a network entity, the plurality of component carriers comprising at least a primary component carrier (PCC) and a secondary component carrier (SCC);
means for determining a set of candidate beams as a subset of the plurality of UE beams having at least one per-beam per-component carrier measurement that satisfies one or more thresholds;
means for selecting, for the wireless communication via the plurality of component carriers, an active beam from the set of candidate beams based at least in part on a per-beam metric that is derived from multiple per-beam per-component carrier measurements associated with the plurality of component carriers and corresponding to the active beam, wherein selection of the active beam is based at least in part on application of a per-candidate beam weight to the per-beam metric for each of one or more beams of the set of candidate beams, wherein the per-candidate beam weight is based at least in part on respective bandwidths of one or more component carriers corresponding to the set of candidate beams; and means for communicating with the network entity via the plurality of component carriers using the active beam.

27. A non-transitory computer-readable medium storing code for wireless communication at a user equipment (UE), the code comprising instructions executable by at least one processor to:

obtain a plurality of per-beam per-component carrier measurements corresponding to unique combinations of individual ones of a plurality of UE beams and individual ones of a plurality of component carriers for the wireless communication between the UE and a network entity, the plurality of component carriers comprising at least a primary component carrier (PCC) and a secondary component carrier (SCC);

determine a set of candidate beams as a subset of the plurality of UE beams having at least one per-beam per-component carrier measurement that satisfies one or more thresholds;

select, for the wireless communication via the plurality of component carriers, an active beam from the set of candidate beams based at least in part on a per-beam metric that is derived from multiple per-beam per-component carrier measurements associated with the plurality of component carriers and corresponding to the active beam, wherein selection of the active beam is based at least in part on application of a per-candidate beam weight to the per-beam metric for each of one or more beams of the set of candidate beams, wherein the per-candidate beam weight is based at least in part on respective bandwidths of one or more component carriers corresponding to the set of candidate beams; and communicate with the network entity via the plurality of component carriers using the active beam.

* * * * *